(12) United States Patent
Ricart et al.

(10) Patent No.: US 11,634,101 B2
(45) Date of Patent: Apr. 25, 2023

(54) REMOVABLE COMPONENT SYSTEM

(71) Applicant: Lear Corporation, Southfield, MI (US)

(72) Inventors: Raúl Ricart, Valls (ES); Antoni Ferré Fàbregas, Valls (ES); Jeffrey A. Jones, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 267 days.

(21) Appl. No.: 17/060,985

(22) Filed: Oct. 1, 2020

(65) Prior Publication Data
US 2021/0101562 A1 Apr. 8, 2021

Related U.S. Application Data

(60) Provisional application No. 62/910,663, filed on Oct. 4, 2019.

(51) Int. Cl.
*B60R 22/48* (2006.01)
*H01Q 1/32* (2006.01)
(Continued)

(52) U.S. Cl.
CPC .............. *B60R 22/48* (2013.01); *B60N 2/07* (2013.01); *B60R 21/013* (2013.01);
(Continued)

(58) Field of Classification Search
CPC ....... B60R 22/48; B60R 21/013; B60R 22/10; B60R 21/207; B60R 2022/4808; B60N 2/07; B60N 2002/0272; H01Q 1/3291
See application file for complete search history.

(56) References Cited

U.S. PATENT DOCUMENTS 2,126,143 A 8/1938 McGregor
2,263,554 A 11/1941 Brach
(Continued)

FOREIGN PATENT DOCUMENTS

CN 203190203 U 9/2013
CN 203799201 U 8/2014
(Continued)

OTHER PUBLICATIONS

Co-Pending U.S. Appl. No. 16/597,187, filed Oct. 9, 2019.
(Continued)

*Primary Examiner* — Paul N Dickson
*Assistant Examiner* — Matthew D Lee
(74) *Attorney, Agent, or Firm* — Fishman Stewart PLLC

(57) ABSTRACT

A removable component system may include a removable component selectively connectable to a mounting surface including a component electrical unit; an antenna; a system controller configured to communicate with the component electrical unit and the antenna; and/or a track assembly configured to be fixed to said mounting surface. The removable component may be selectively connectable to said mounting surface via the track assembly. The removable component may be configured for selective connection with, removal from, and movement along the track assembly. The system controller may be configured to obtain a position of the removable component relative to said mounting surface via the antenna and the component electrical unit (e.g., via a component controller, a sensor, and/or a communication device thereof).

20 Claims, 18 Drawing Sheets

(51) Int. Cl.
*B60R 21/207* (2006.01)
*B60R 21/013* (2006.01)
*B60R 22/10* (2006.01)
*B60N 2/07* (2006.01)

(52) U.S. Cl.
CPC ............ *B60R 21/207* (2013.01); *B60R 22/10* (2013.01); *H01Q 1/3291* (2013.01); *B60R 2022/4808* (2013.01)

(56) References Cited

U.S. PATENT DOCUMENTS

| | | |
|---|---|---|
| 2,480,622 A | 8/1949 | Warnock |
| 2,678,082 A | 5/1954 | Nathan |
| 3,181,102 A | 4/1965 | Fehr |
| 3,213,403 A | 10/1965 | Hermann |
| 3,268,848 A | 8/1966 | Adams |
| 3,603,918 A | 9/1971 | Woertz |
| 3,933,403 A | 1/1976 | Rubesamen et al. |
| 3,940,182 A | 2/1976 | Tamura |
| 4,020,769 A | 5/1977 | Keir |
| 4,198,025 A | 4/1980 | Lowe et al. |
| 4,243,248 A | 1/1981 | Scholz et al. |
| 4,282,631 A | 8/1981 | Uehara et al. |
| 4,511,187 A | 4/1985 | Rees |
| 4,575,295 A | 3/1986 | Rebentisch |
| 4,618,808 A | 10/1986 | Ish-Shalom et al. |
| 4,707,030 A | 11/1987 | Harding |
| 4,711,589 A | 12/1987 | Goodbred |
| 4,763,360 A | 8/1988 | Daniels et al. |
| 4,776,809 A | 10/1988 | Hall |
| 4,830,531 A | 5/1989 | Condit et al. |
| 4,853,555 A | 8/1989 | Wheat |
| 4,961,559 A | 10/1990 | Raymor |
| 4,969,621 A | 11/1990 | Munchow et al. |
| 4,987,316 A | 1/1991 | White et al. |
| 5,106,144 A | 4/1992 | Hayakawa et al. |
| 5,137,331 A | 8/1992 | Colozza |
| 5,167,393 A | 12/1992 | Hayakawa et al. |
| 5,192,045 A | 3/1993 | Yamada et al. |
| 5,222,814 A | 6/1993 | Boelryk |
| 5,302,065 A | 4/1994 | Vogg et al. |
| 5,322,982 A | 6/1994 | Leger et al. |
| 5,332,290 A | 7/1994 | Borlinghaus et al. |
| 5,348,373 A | 9/1994 | Stiennon |
| 5,362,241 A | 11/1994 | Matsuoka et al. |
| 5,446,442 A | 8/1995 | Swart et al. |
| 5,466,892 A | 11/1995 | Howard et al. |
| 5,489,173 A | 2/1996 | Hofle |
| 5,582,381 A | 12/1996 | Graf et al. |
| 5,599,086 A | 2/1997 | Dutta |
| 5,618,192 A | 4/1997 | Drury |
| 5,655,816 A | 8/1997 | Magnuson et al. |
| 5,676,341 A | 10/1997 | Tarusawa et al. |
| 5,696,409 A | 12/1997 | Handman et al. |
| 5,701,037 A | 12/1997 | Weber et al. |
| 5,796,177 A | 8/1998 | Werbelow et al. |
| 5,800,015 A | 9/1998 | Tsuchiya et al. |
| 5,899,532 A | 5/1999 | Paisley et al. |
| 5,918,847 A | 7/1999 | Couasnon |
| 5,921,606 A | 7/1999 | Moradell et al. |
| 5,964,442 A | 10/1999 | Wingblad et al. |
| 5,964,815 A | 10/1999 | Wallace et al. |
| 6,008,547 A | 12/1999 | Dobler et al. |
| 6,036,157 A | 3/2000 | Baroin et al. |
| 6,081,044 A | 6/2000 | Anthofer et al. |
| 6,142,718 A | 11/2000 | Kroll |
| 6,150,774 A | 11/2000 | Mueller et al. |
| 6,166,451 A | 12/2000 | Pigott |
| 6,216,995 B1 | 4/2001 | Koester |
| 6,227,595 B1 | 5/2001 | Hamelin et al. |
| 6,290,516 B1 | 9/2001 | Gerber |
| 6,296,498 B1 | 10/2001 | Ross |
| 6,299,230 B1 | 10/2001 | Oettl |
| 6,318,802 B1 | 11/2001 | Sjostrom et al. |
| 6,325,645 B1 | 12/2001 | Schuite |
| 6,357,814 B1 | 3/2002 | Boisset et al. |
| 6,393,348 B1 | 5/2002 | Ziegler et al. |
| 6,400,259 B1 | 6/2002 | Bourcart et al. |
| 6,405,988 B1 | 6/2002 | Taylor et al. |
| 6,422,596 B1 | 7/2002 | Fendt et al. |
| 6,439,531 B1 | 8/2002 | Severini et al. |
| 6,480,144 B1 | 11/2002 | Miller et al. |
| 6,565,119 B2 | 5/2003 | Fogle, Jr. |
| 6,566,765 B1 | 5/2003 | Nitschke et al. |
| 6,588,722 B2 | 7/2003 | Eguchi et al. |
| 6,693,368 B2 | 2/2004 | Schumann et al. |
| 6,696,943 B1 | 2/2004 | Elrod et al. |
| 6,710,470 B2 | 3/2004 | Bauer et al. |
| 6,719,350 B2 | 4/2004 | Duchateau et al. |
| 6,736,458 B2 | 5/2004 | Chabanne et al. |
| 6,772,056 B2 | 8/2004 | Mattes et al. |
| 6,799,100 B2 | 9/2004 | Burns et al. |
| 6,805,375 B2 | 10/2004 | Enders et al. |
| 6,809,643 B1 | 10/2004 | Elrod et al. |
| 6,851,708 B2 | 2/2005 | Kazmierczak |
| 6,869,057 B2 | 3/2005 | Matsumoto et al. |
| 6,882,162 B2 | 4/2005 | Schirmer et al. |
| 6,960,993 B2 | 11/2005 | Mattes et al. |
| 7,012,533 B2 | 3/2006 | Younse |
| 7,042,342 B2 | 5/2006 | Luo et al. |
| 7,083,437 B2 | 8/2006 | Mackness |
| 7,086,874 B2 | 8/2006 | Mitchell et al. |
| 7,113,541 B1 | 9/2006 | Lys et al. |
| 7,159,899 B2 | 1/2007 | Nitschke et al. |
| 7,170,192 B2 | 1/2007 | Kazmierczak |
| 7,188,805 B2 | 3/2007 | Henley et al. |
| 7,207,541 B2 | 4/2007 | Frohnhaus et al. |
| 7,271,501 B2 | 9/2007 | Dukart et al. |
| 7,288,009 B2 | 10/2007 | Lawrence et al. |
| 7,293,831 B2 | 11/2007 | Greene |
| 7,300,091 B2 | 11/2007 | Nihonmatsu et al. |
| 7,322,605 B2 | 1/2008 | Ventura et al. |
| 7,348,687 B2 | 3/2008 | Aichriedler et al. |
| 7,363,194 B2 | 4/2008 | Schlick et al. |
| 7,370,831 B2 | 5/2008 | Laib et al. |
| 7,388,466 B2 | 6/2008 | Ghabra et al. |
| 7,389,960 B2 | 6/2008 | Mitchell et al. |
| 7,416,042 B2 | 8/2008 | Czaykowska et al. |
| 7,434,883 B2 | 10/2008 | Deptolla |
| 7,454,170 B2 | 11/2008 | Goossens et al. |
| 7,455,535 B2 | 11/2008 | Insalaco et al. |
| 7,503,522 B2 | 3/2009 | Henley et al. |
| 7,505,754 B2 | 3/2009 | Kazmierczak et al. |
| 7,523,913 B2 | 4/2009 | Mizuno et al. |
| 7,556,233 B2 | 7/2009 | Gryp et al. |
| 7,560,827 B2 | 7/2009 | Jacas-Miret et al. |
| 7,633,301 B2 | 12/2009 | Steenwyk et al. |
| 7,643,913 B2 | 1/2010 | Taki et al. |
| 7,661,637 B2 | 2/2010 | Mejuhas et al. |
| 7,665,939 B1 | 2/2010 | Cardona |
| 7,739,820 B2 | 6/2010 | Frank |
| 7,744,386 B1 | 6/2010 | Speidel et al. |
| 7,980,525 B2 | 7/2011 | Kostin |
| 7,980,798 B1 | 7/2011 | Kuehn et al. |
| 8,010,255 B2 | 8/2011 | Darraba |
| 8,146,991 B2 | 4/2012 | Stanz et al. |
| 8,179,274 B2 | 5/2012 | Rork et al. |
| 8,190,332 B2 | 5/2012 | Saban |
| 8,278,840 B2 | 10/2012 | Logiudice et al. |
| 8,282,326 B2 | 10/2012 | Krostue et al. |
| 8,376,675 B2 | 2/2013 | Schulze et al. |
| 8,463,501 B2 | 6/2013 | Jousse |
| 8,536,928 B1 | 9/2013 | Gagne et al. |
| 8,648,613 B2 | 2/2014 | Ewerhart et al. |
| 8,702,170 B2 | 4/2014 | Abraham et al. |
| 8,757,720 B2 | 6/2014 | Hurst, III et al. |
| 8,800,949 B2 | 8/2014 | Schebaum et al. |
| 8,816,845 B2 | 8/2014 | Hoover et al. |
| 8,857,778 B2 | 10/2014 | Nonomiya |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |

(56) References Cited

U.S. PATENT DOCUMENTS

| | | | |
|---|---|---|---|
| 9,018,869 B2 | 4/2015 | Yuasa et al. | |
| 9,045,061 B2 | 6/2015 | Kostin et al. | |
| 9,162,590 B2 | 10/2015 | Nagura et al. | |
| 9,174,604 B2 | 11/2015 | Wellhoefer et al. | |
| 9,242,580 B2 | 1/2016 | Schebaum et al. | |
| 9,251,631 B2 | 2/2016 | Thompson et al. | |
| 9,318,922 B2 | 4/2016 | Hall et al. | |
| 9,340,125 B2 | 5/2016 | Stutika et al. | |
| 9,346,428 B2 | 5/2016 | Bortolin | |
| 9,422,058 B2 | 8/2016 | Fischer et al. | |
| 9,519,905 B2 | 12/2016 | Basir | |
| 9,561,770 B2 | 2/2017 | Sievers et al. | |
| 9,608,392 B1 | 3/2017 | Destro | |
| 9,610,862 B2 | 4/2017 | Bonk et al. | |
| 9,663,232 B1 | 5/2017 | Porter et al. | |
| 9,673,583 B2 | 6/2017 | Hudson et al. | |
| 9,691,250 B2 | 6/2017 | Trang et al. | |
| 9,701,217 B2 | 7/2017 | Eckenroth et al. | |
| 9,731,628 B1 | 8/2017 | Rao et al. | |
| 9,758,061 B2 | 9/2017 | Pluta et al. | |
| 9,789,834 B2 | 10/2017 | Rapp et al. | |
| 9,796,304 B2 | 10/2017 | Salter et al. | |
| 9,815,425 B2 | 11/2017 | Rao et al. | |
| 9,821,681 B2 | 11/2017 | Rao et al. | |
| 9,840,220 B2 | 12/2017 | Van Buskirk et al. | |
| 9,919,624 B2 | 3/2018 | Cziomer et al. | |
| 9,950,682 B1 | 4/2018 | Gramenos et al. | |
| 10,034,631 B1 | 7/2018 | Gallagher et al. | |
| 10,059,232 B2 | 8/2018 | Frye et al. | |
| 10,160,351 B2 | 12/2018 | Sugimoto et al. | |
| 10,479,227 B2 | 11/2019 | Nolte et al. | |
| 10,493,243 B1 | 12/2019 | Braham | |
| 10,547,135 B2 | 1/2020 | Sugiura | |
| 10,549,659 B2 | 2/2020 | Sullivan et al. | |
| 10,654,378 B2 | 5/2020 | Pons | |
| 2005/0046367 A1 | 3/2005 | Wevers et al. | |
| 2005/0089367 A1 | 4/2005 | Sempliner | |
| 2005/0150705 A1 | 7/2005 | Vincent et al. | |
| 2005/0211835 A1 | 9/2005 | Henley et al. | |
| 2005/0215098 A1 | 9/2005 | Muramatsu et al. | |
| 2005/0230543 A1 | 10/2005 | Laib et al. | |
| 2005/0236899 A1 | 10/2005 | Kazmierczak | |
| 2005/0258676 A1 | 11/2005 | Mitchell et al. | |
| 2006/0131470 A1 | 6/2006 | Yamada et al. | |
| 2006/0208549 A1 | 9/2006 | Hancock et al. | |
| 2006/0220411 A1 | 10/2006 | Pathak et al. | |
| 2008/0021602 A1 | 1/2008 | Kingham et al. | |
| 2008/0084085 A1 | 4/2008 | Mizuno et al. | |
| 2008/0090432 A1 | 4/2008 | Patterson et al. | |
| 2008/0157940 A1* | 7/2008 | Breed | G06F 3/0233 340/425.5 |
| 2009/0014584 A1 | 1/2009 | Rudduck et al. | |
| 2009/0129105 A1 | 5/2009 | Kusu et al. | |
| 2009/0251920 A1 | 10/2009 | Kino et al. | |
| 2009/0302665 A1 | 12/2009 | Dowty | |
| 2009/0319212 A1 | 12/2009 | Cech et al. | |
| 2010/0117275 A1 | 5/2010 | Nakamura | |
| 2010/0256835 A1 | 10/2010 | Mudalige | |
| 2011/0024595 A1 | 2/2011 | Oi et al. | |
| 2011/0225773 A1 | 9/2011 | Hearn et al. | |
| 2012/0112032 A1 | 5/2012 | Kohen | |
| 2013/0020459 A1 | 1/2013 | Moriyama et al. | |
| 2013/0035994 A1 | 2/2013 | Pattan et al. | |
| 2013/0049955 A1 | 2/2013 | Hoover et al. | |
| 2013/0153735 A1 | 6/2013 | Ruthman et al. | |
| 2014/0085070 A1 | 3/2014 | Schoenberg | |
| 2014/0110554 A1 | 4/2014 | Oya et al. | |
| 2014/0263920 A1 | 9/2014 | Anticuar et al. | |
| 2014/0265479 A1 | 9/2014 | Bennett | |
| 2015/0048206 A1 | 2/2015 | Deloubes | |
| 2015/0069807 A1 | 3/2015 | Kienke | |
| 2015/0077561 A1 | 3/2015 | Schulz | |
| 2015/0083882 A1 | 3/2015 | Stutika et al. | |
| 2015/0191106 A1 | 7/2015 | Inoue et al. | |
| 2015/0236462 A1 | 8/2015 | Davidson, Jr. et al. | |
| 2016/0039314 A1 | 2/2016 | Anticuar et al. | |
| 2016/0154170 A1 | 6/2016 | Thompson et al. | |
| 2016/0236613 A1 | 8/2016 | Trier | |
| 2016/0304045 A1 | 10/2016 | Cuddihy et al. | |
| 2016/0379466 A1 | 12/2016 | Payant et al. | |
| 2017/0080825 A1 | 3/2017 | Bonk et al. | |
| 2017/0080826 A1* | 3/2017 | Bonk | B60N 2/06 |
| 2017/0166093 A1 | 6/2017 | Cziomer et al. | |
| 2017/0261343 A1 | 9/2017 | Lanter et al. | |
| 2017/0291507 A1 | 10/2017 | Hattori et al. | |
| 2018/0017189 A1 | 1/2018 | Wegner | |
| 2018/0039917 A1 | 2/2018 | Buttolo et al. | |
| 2018/0072188 A1 | 3/2018 | Yamada | |
| 2018/0086232 A1 | 3/2018 | Kume | |
| 2018/0105072 A1 | 4/2018 | Pons | |
| 2018/0148011 A1 | 5/2018 | Zaugg et al. | |
| 2018/0154799 A1 | 6/2018 | Lota | |
| 2018/0183623 A1 | 6/2018 | Schoenfeld et al. | |
| 2018/0244175 A1 | 8/2018 | Tan | |
| 2018/0275648 A1 | 9/2018 | Ramalingam | |
| 2019/0001846 A1 | 1/2019 | Jackson et al. | |
| 2019/0084453 A1 | 3/2019 | Petit et al. | |
| 2019/0126786 A1 | 5/2019 | Dry et al. | |
| 2019/0337413 A1 | 11/2019 | Romer | |
| 2019/0337414 A1 | 11/2019 | Condamin et al. | |
| 2019/0337415 A1 | 11/2019 | Condamin et al. | |
| 2019/0337416 A1 | 11/2019 | Condamin et al. | |
| 2019/0337417 A1 | 11/2019 | Condamin et al. | |
| 2019/0337418 A1 | 11/2019 | Condamin et al. | |
| 2019/0337419 A1 | 11/2019 | Condamin et al. | |
| 2019/0337420 A1 | 11/2019 | Condamin et al. | |
| 2019/0337421 A1 | 11/2019 | Condamin et al. | |
| 2019/0337422 A1 | 11/2019 | Condamin et al. | |
| 2019/0337471 A1 | 11/2019 | Brehm | |
| 2019/0379187 A1 | 12/2019 | Christensen et al. | |
| 2019/0389336 A1 | 12/2019 | Malinowski et al. | |
| 2020/0009995 A1 | 1/2020 | Sonar | |
| 2020/0047641 A1 | 2/2020 | D'Eramo et al. | |
| 2020/0055423 A1 | 2/2020 | Prozzi et al. | |
| 2020/0079244 A1 | 3/2020 | Carbone et al. | |
| 2020/0171979 A1* | 6/2020 | Yetukuri | B60N 2/01 |
| 2020/0180516 A1 | 6/2020 | Moulin | |
| 2020/0180517 A1 | 6/2020 | Moulin | |
| 2020/0189504 A1 | 6/2020 | Ricart et al. | |
| 2020/0189511 A1 | 6/2020 | Ricart et al. | |
| 2020/0194936 A1 | 6/2020 | Ricart et al. | |
| 2020/0194948 A1 | 6/2020 | Lammers et al. | |
| 2020/0207241 A1 | 7/2020 | Moulin et al. | |
| 2020/0247275 A1 | 8/2020 | Yetukuri et al. | |
| 2020/0262367 A1 | 8/2020 | Fernandez Banares et al. | |
| 2020/0269754 A1 | 8/2020 | Ricart et al. | |
| 2020/0282871 A1 | 9/2020 | Ricart et al. | |
| 2020/0282880 A1 | 9/2020 | Jones et al. | |
| 2020/0298780 A1* | 9/2020 | Kanegae | B60R 21/206 |
| 2022/0063555 A1* | 3/2022 | Kanegae | B60R 22/343 |

FOREIGN PATENT DOCUMENTS

| | | | | |
|---|---|---|---|---|
| DE | 202005013714 U1 | 12/2005 | | |
| DE | 102005007430 A1 | 3/2006 | | |
| DE | 102006022032 A1 | 12/2006 | | |
| DE | 102010017038 A1 | 2/2011 | | |
| DE | 102011056278 A1 | 2/2013 | | |
| DE | 202014102336 U1 | 6/2014 | | |
| DE | 102015212100 A1 | 12/2015 | | |
| DE | 102016113409 A1 | 4/2017 | | |
| EP | 0783990 A1 | 7/1997 | | |
| EP | 1176047 A1 | 1/2002 | | |
| EP | 1310407 B1 * | 5/2006 | | B60N 2/0224 |
| EP | 2298609 B1 | 3/2011 | | |
| EP | 3150426 A1 | 4/2017 | | |
| FR | 2762814 A1 | 11/1998 | | |
| FR | 2951329 A1 | 4/2011 | | |
| FR | 2986751 A1 | 8/2013 | | |
| GB | 2327914 A * | 2/1999 | | B60N 2/002 |
| GB | 2396944 A * | 7/2004 | | B60N 2/06 |
| JP | 3314591 B2 | 8/2002 | | |
| JP | 2003227703 A | 8/2003 | | |
| JP | 2005119518 A | 5/2005 | | |

(56) References Cited

FOREIGN PATENT DOCUMENTS

| | | |
|---|---|---|
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 2005068247 A2 | 7/2005 |

OTHER PUBLICATIONS

Co-Pending U.S. Appl. No. 16/672,989, filed Nov. 4, 2019.
Co-Pending U.S. Appl. No. 16/711,661, filed Dec. 12, 2019.
Co-Pending U.S. Appl. No. 17/060,566, filed Oct. 1, 2020.
Co-Pending U.S. Appl. No. 17/060,635, filed Oct. 1, 2020.
Don't Forget Your Baby in the Car! There's an App for That; https://www.parents.com/baby/all-about-babies/dont-forget-your-baby-in-the-car-theres-an-app-for-that/; Jul. 25, 2014.

\* cited by examiner

REMOVABLE COMPONENT SYSTEM

CROSS-REFERENCE TO RELATED APPLICATION

This application claims the benefit of U.S. Provisional Patent Application Ser. No. 62/910,663, filed on Oct. 4, 2019, the disclosure of which is hereby incorporated by reference in its entirety as though fully set forth herein.

TECHNICAL FIELD

The present disclosure generally relates to removable component systems, including removable component systems that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some systems are not configured for removable components and/or for communicating effectively and efficiently with removable components.

There is a desire for solutions/options that minimize or eliminate one or more challenges or shortcomings of removable component systems. The foregoing discussion is intended only to illustrate examples of the present field and is not a disavowal of scope.

SUMMARY

In embodiments, a removable component system may include a removable component selectively connectable to a mounting surface and including a component electrical unit; an antenna; a system controller configured to communicate with the component electrical unit and the antenna; and/or a track assembly configured to be fixed to said mounting surface. The removable component may be selectively connectable to said mounting surface via the track assembly. The removable component may be configured for selective connection with, removal from, and movement (e.g., sliding) along the track assembly. The system controller may be configured to obtain a position of the removable component relative to said mounting surface via the antenna and the component electrical unit (e.g., via a component controller, a sensor, and/or a communication device thereof).

With embodiments, a vehicle may include a vehicle controller configured to control operation (e.g., propulsion) of the vehicle and a removable component system. A mounting surface may include a floor of the vehicle. The removable component may be configured as a vehicle seat. The system controller may be configured to communicate with and/or may be incorporated with the vehicle controller.

In embodiments, a method of operating a removable component system may include obtaining the position and the orientation of a removable component, obtaining information about any child seats in the removable component system, creating a system model of the removable component system, obtaining crash information, and/or controlling one or more safety devices according to the position of the removable component, the orientation or the removable component, the crash information, and the information about any child seats. The system model may include models of the removable component, the one or more safety devices, and/or a mounting surface.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Figure 1A:
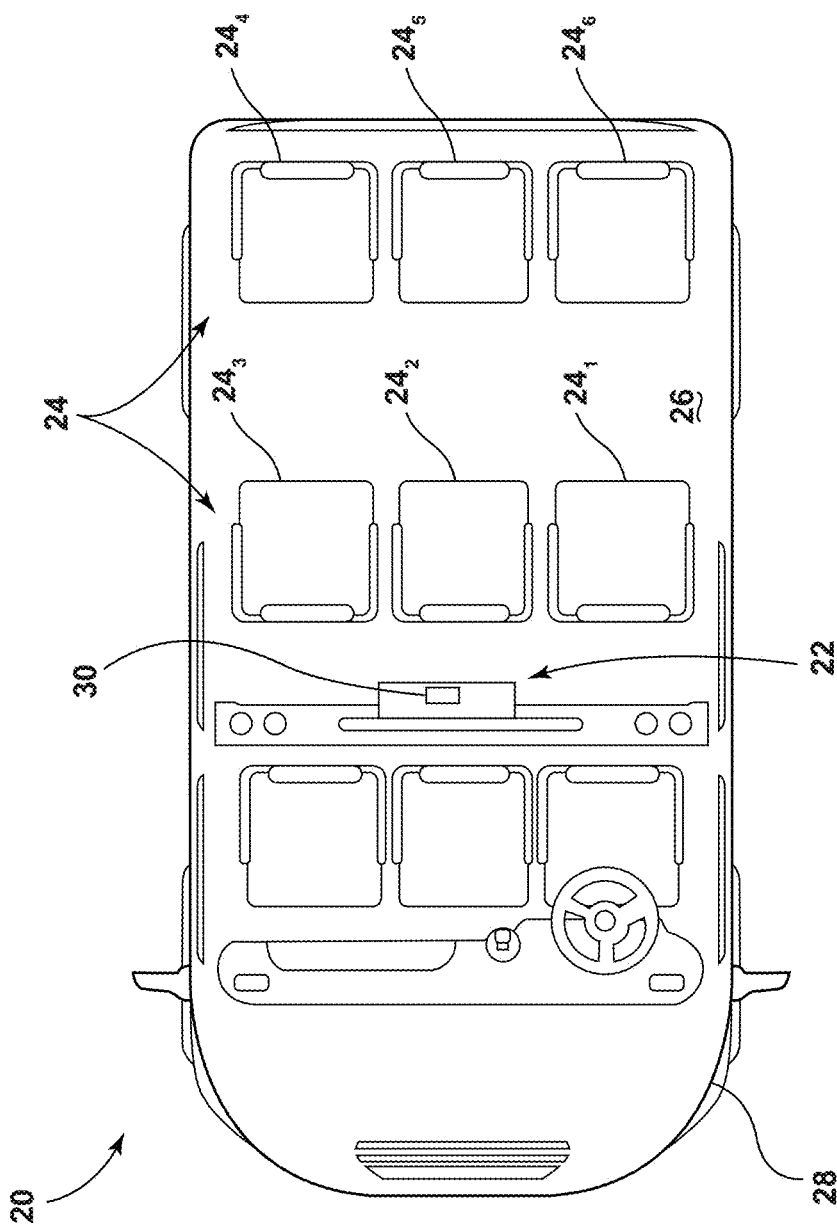
FIGS. 1A-1D are top views generally illustrating embodiments of removable component systems according to teachings of the present disclosure.
Figure 1B:
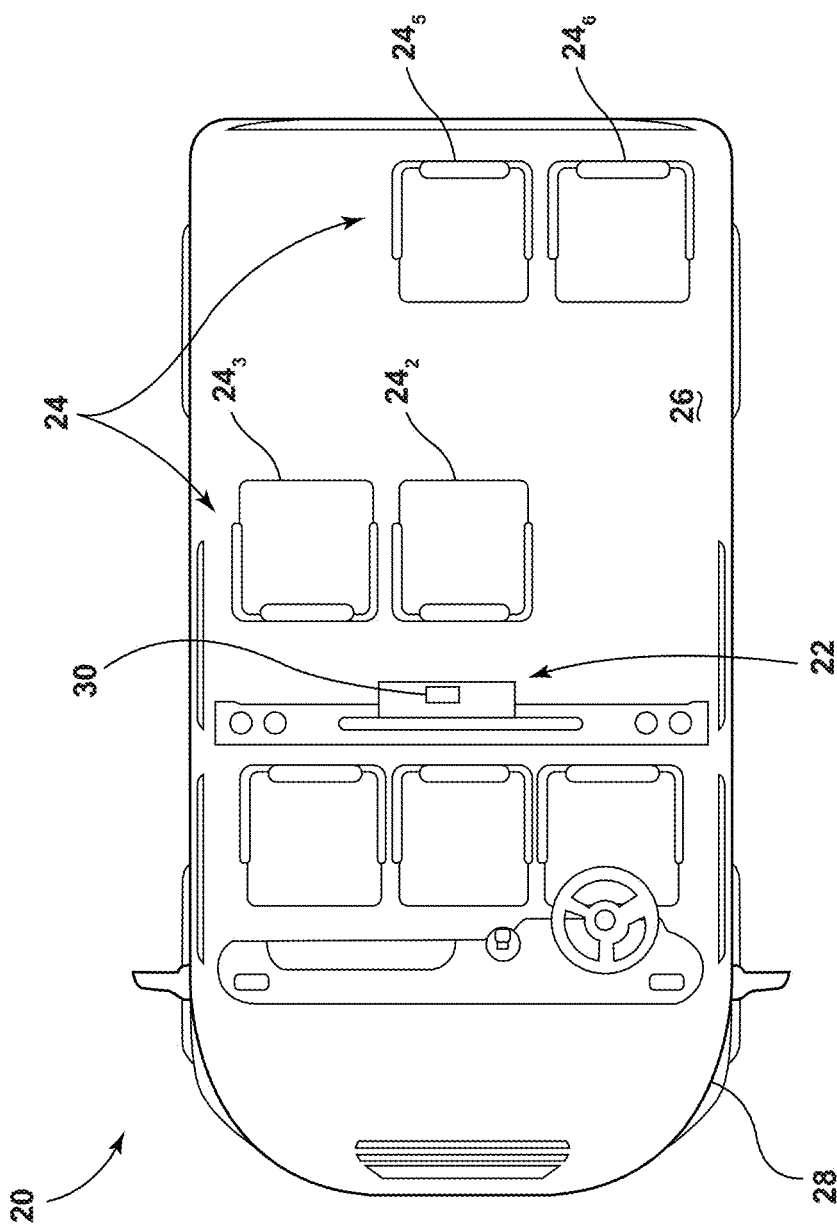
Figure 1C:
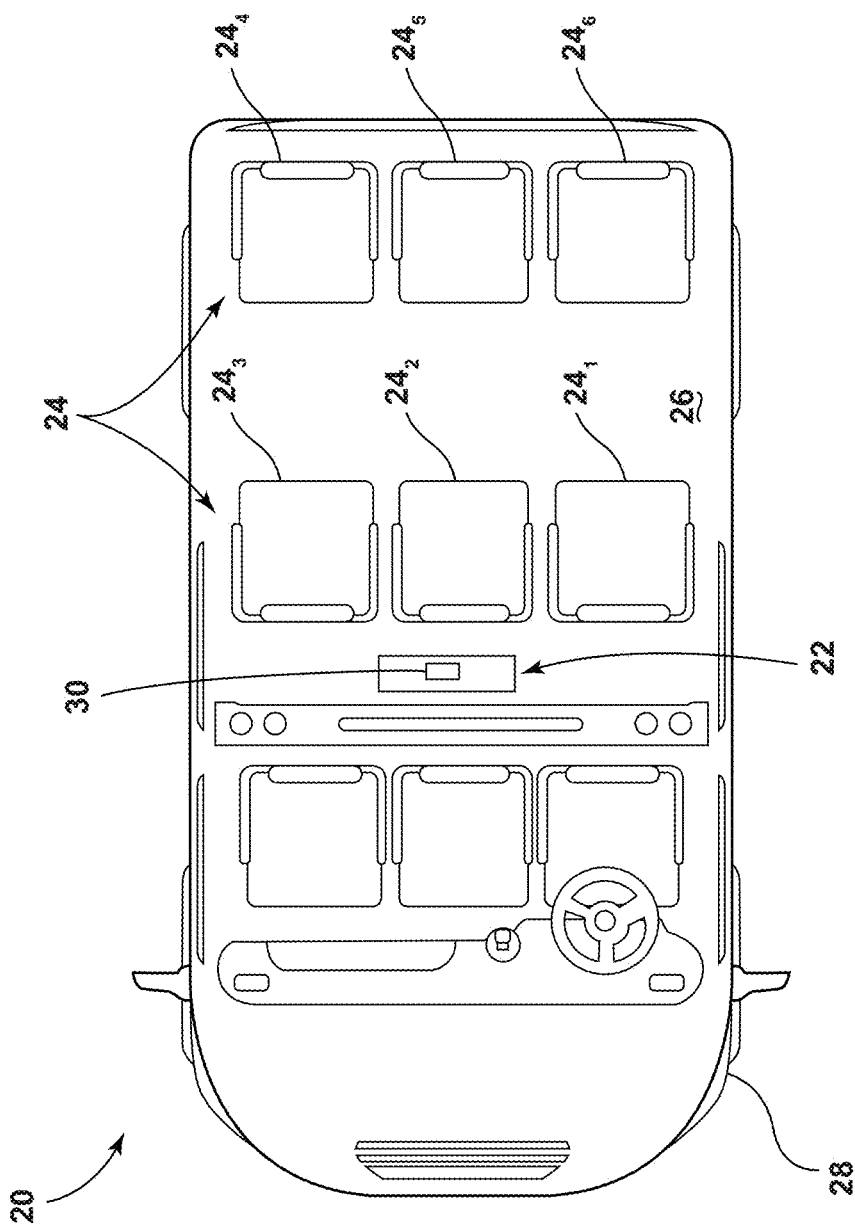
Figure 1D:
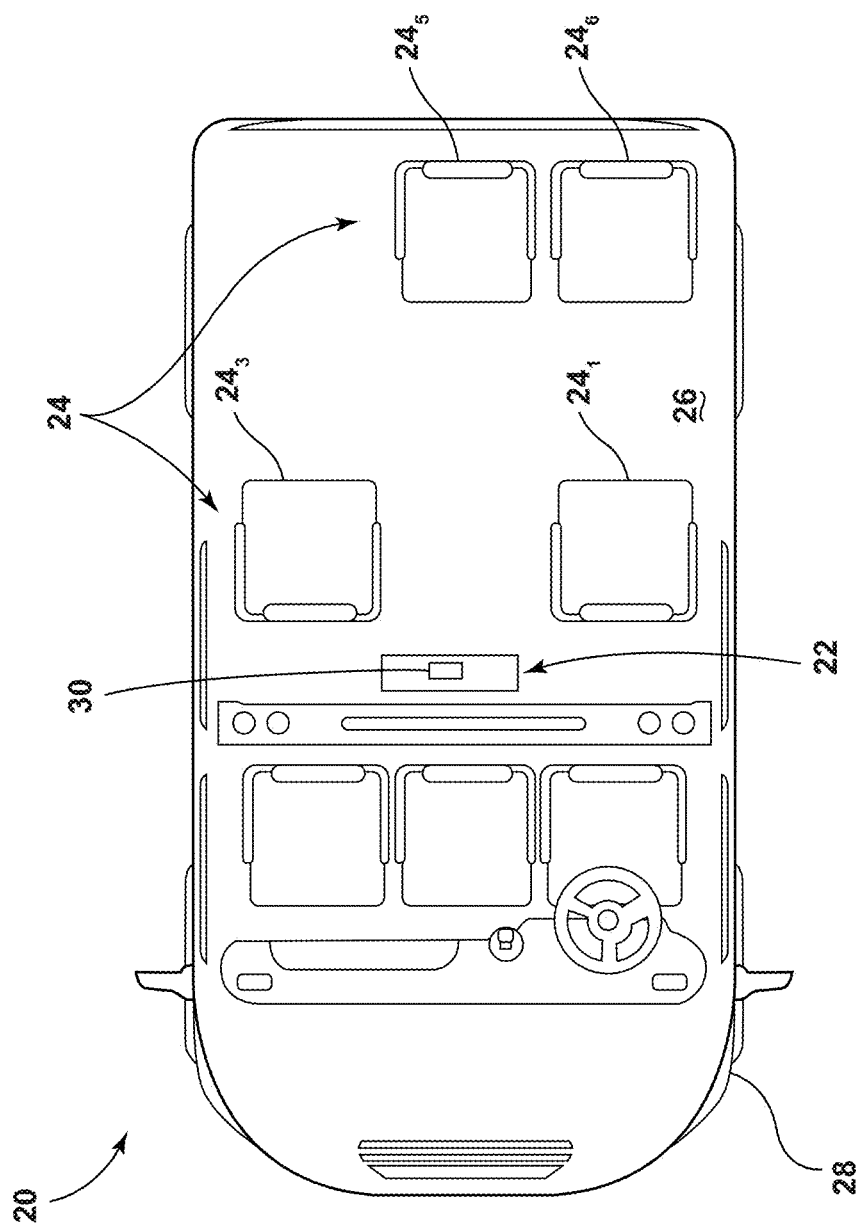
Figure 2A:
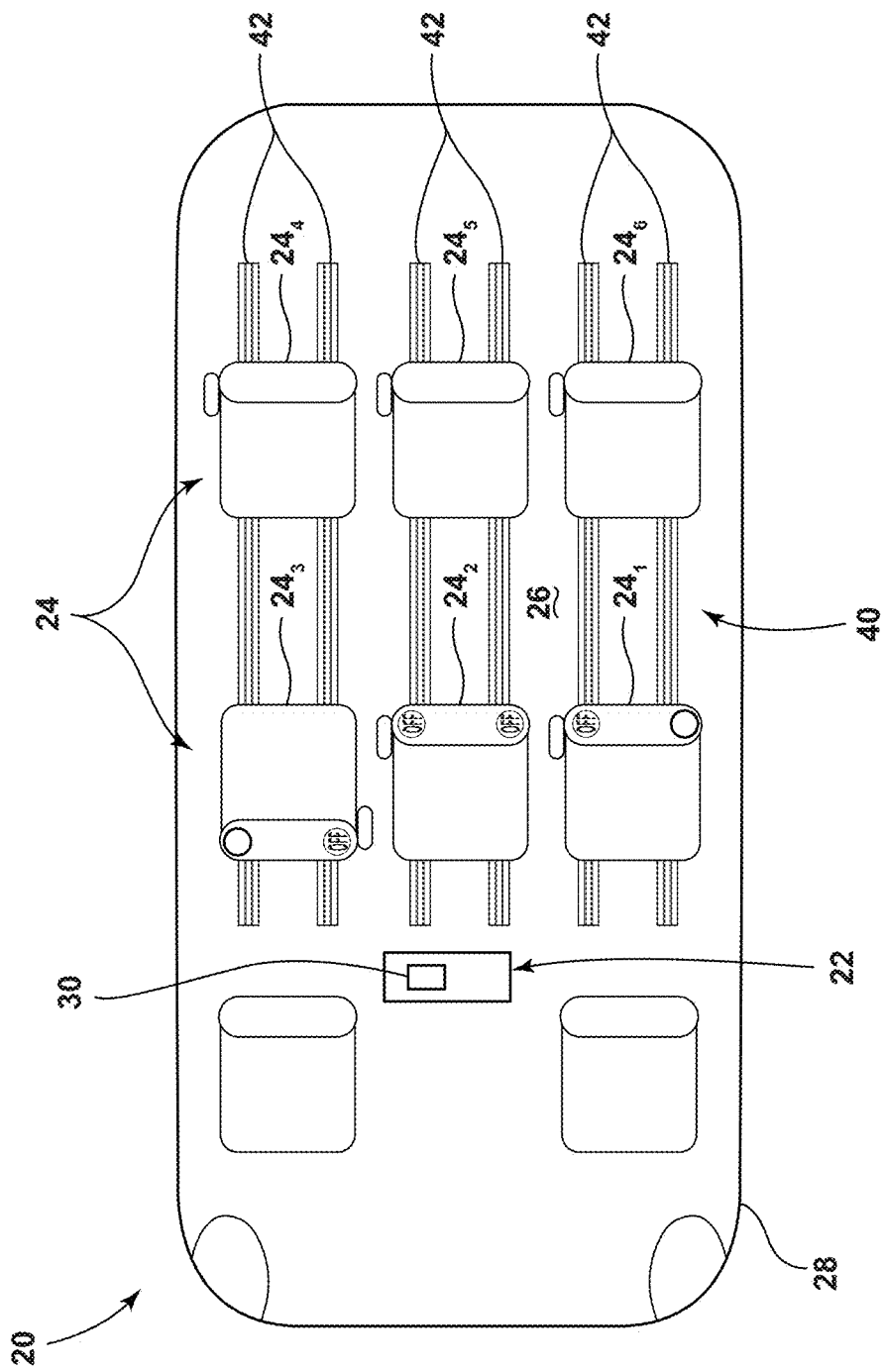
FIGS. 2A-2D are top views generally illustrating embodiments of removable component systems according to teachings of the present disclosure.
Figure 2B:
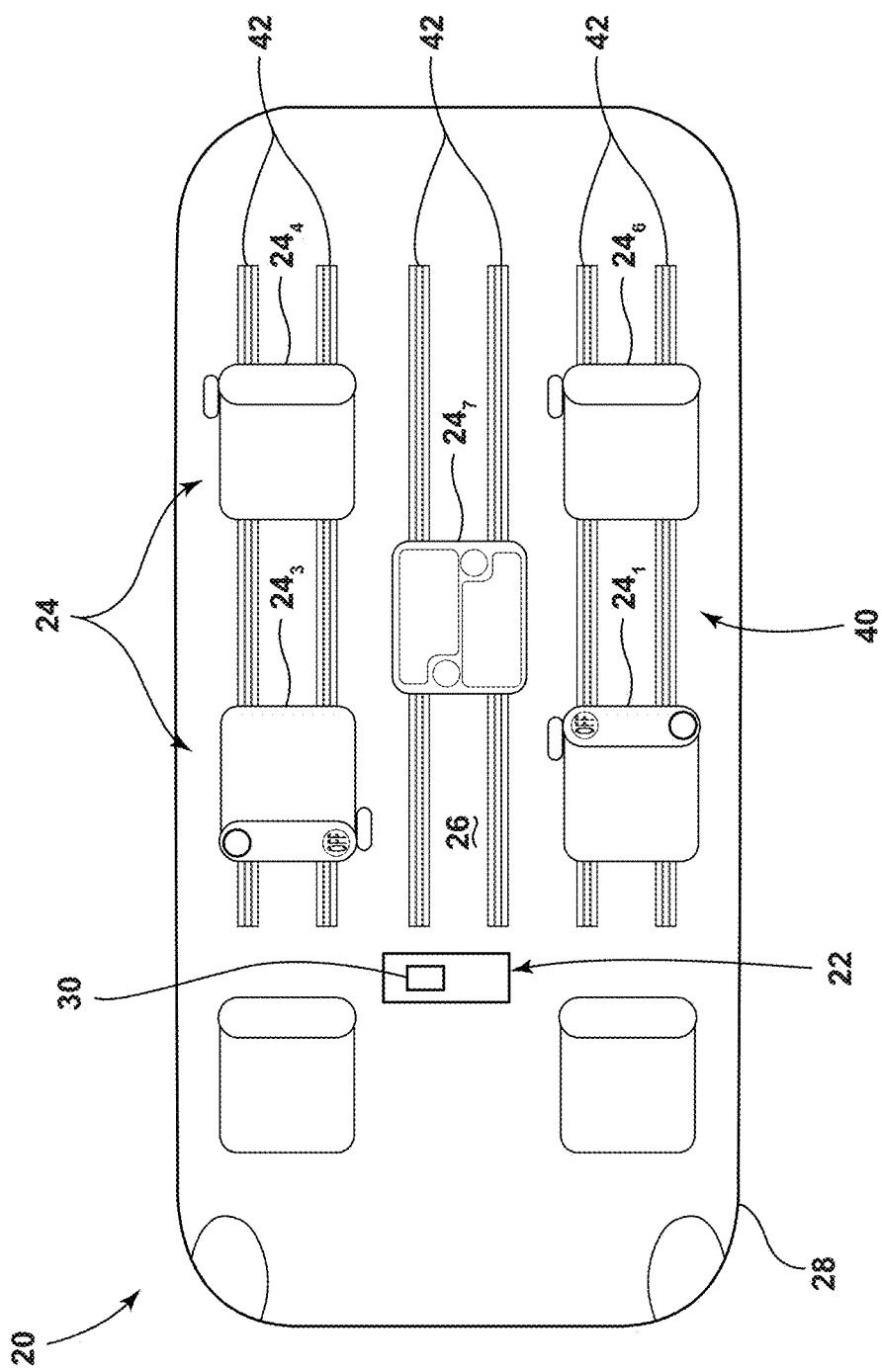
Figure 2C:
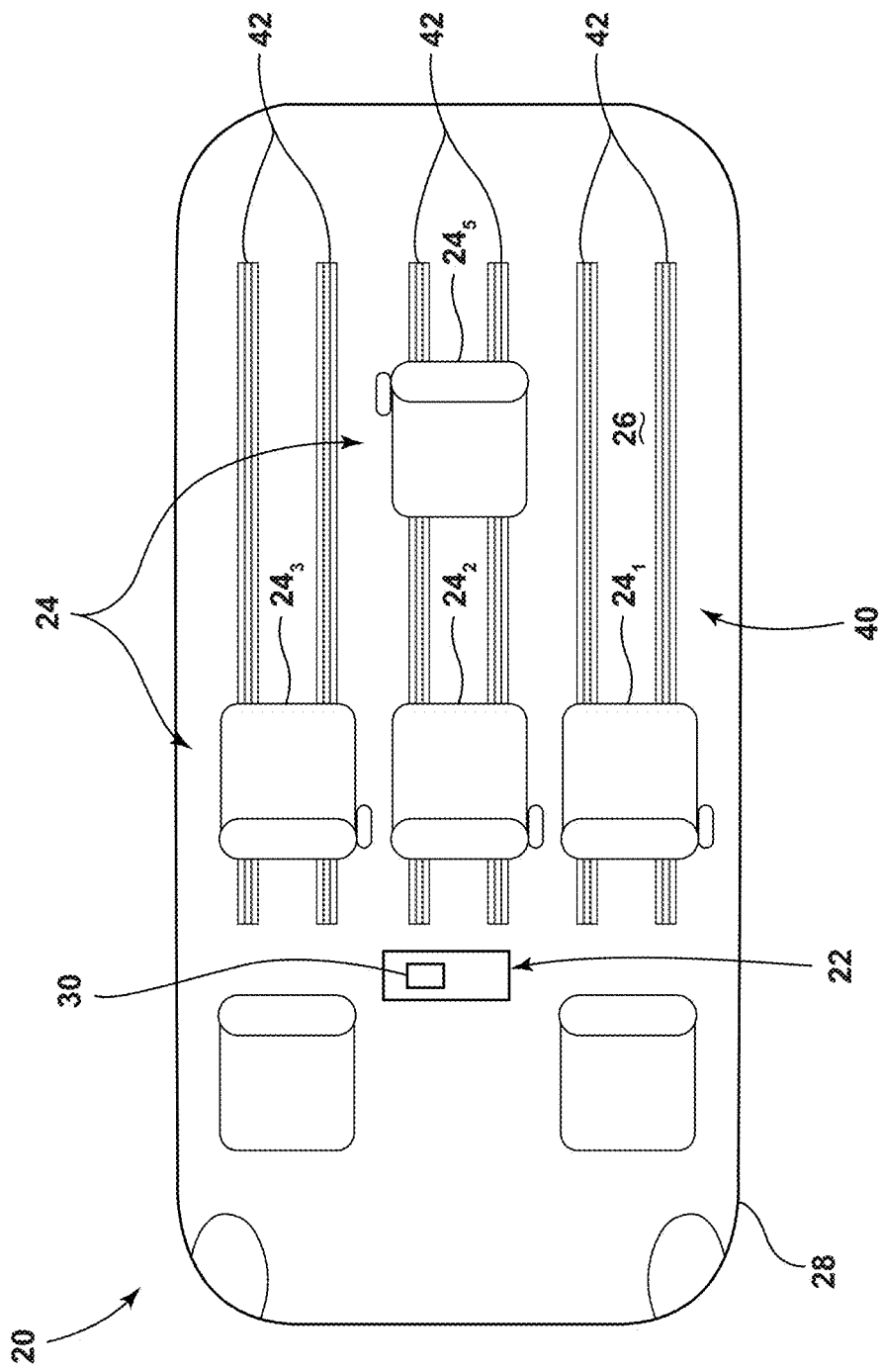
Figure 2D:
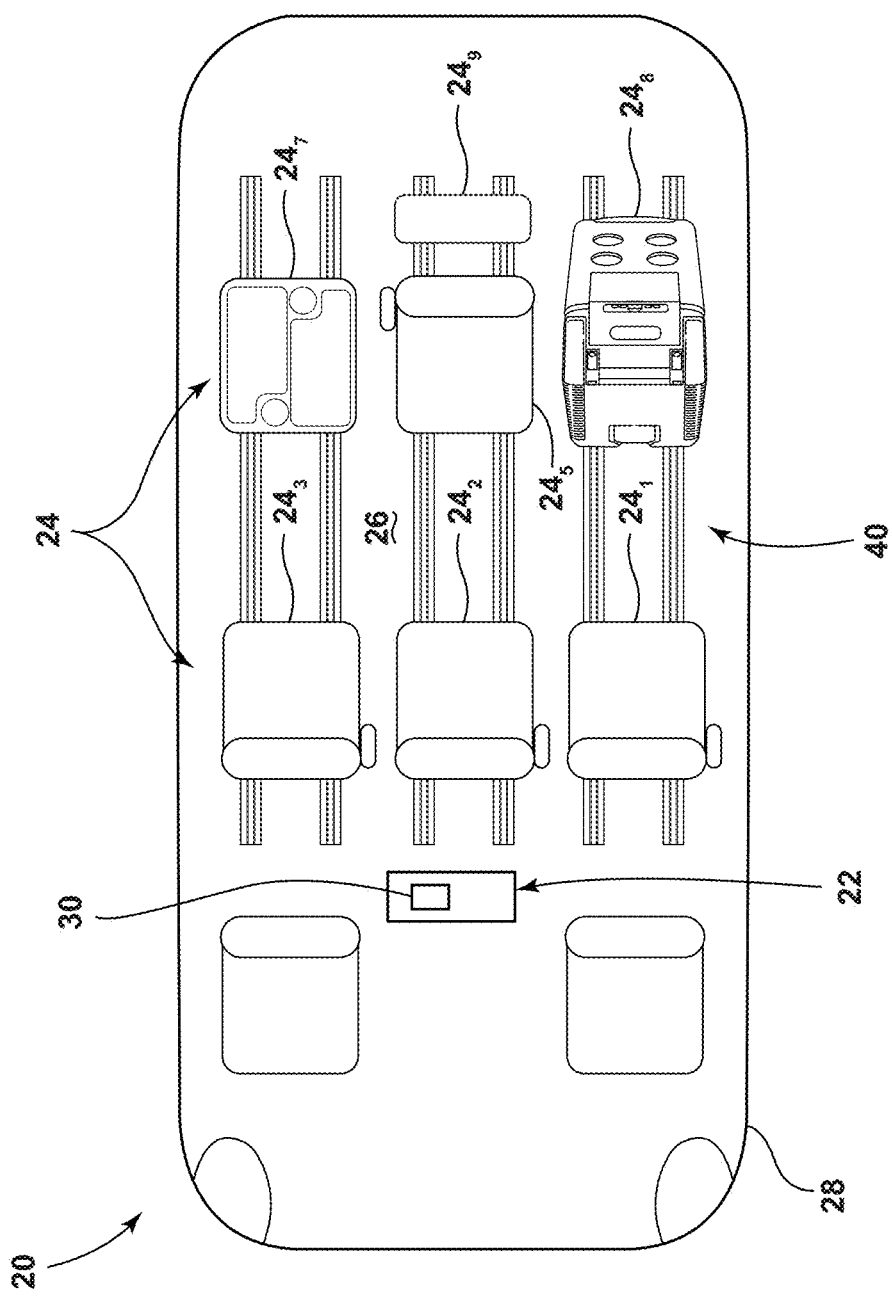

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

In embodiments, such as generally illustrated in FIGS. 1-6, a removable component system 20 may include a system electrical unit 22 and/or one or more removable components 24 (e.g., removable components $24_1$-$24_9$) that may be selectively connected to a mounting surface 26. A mounting surface 26 may, for example and without limitation, include one or more portions of a vehicle 28, such as a floor and/or an interior surface (which may include a truck bed).

Figure 4:
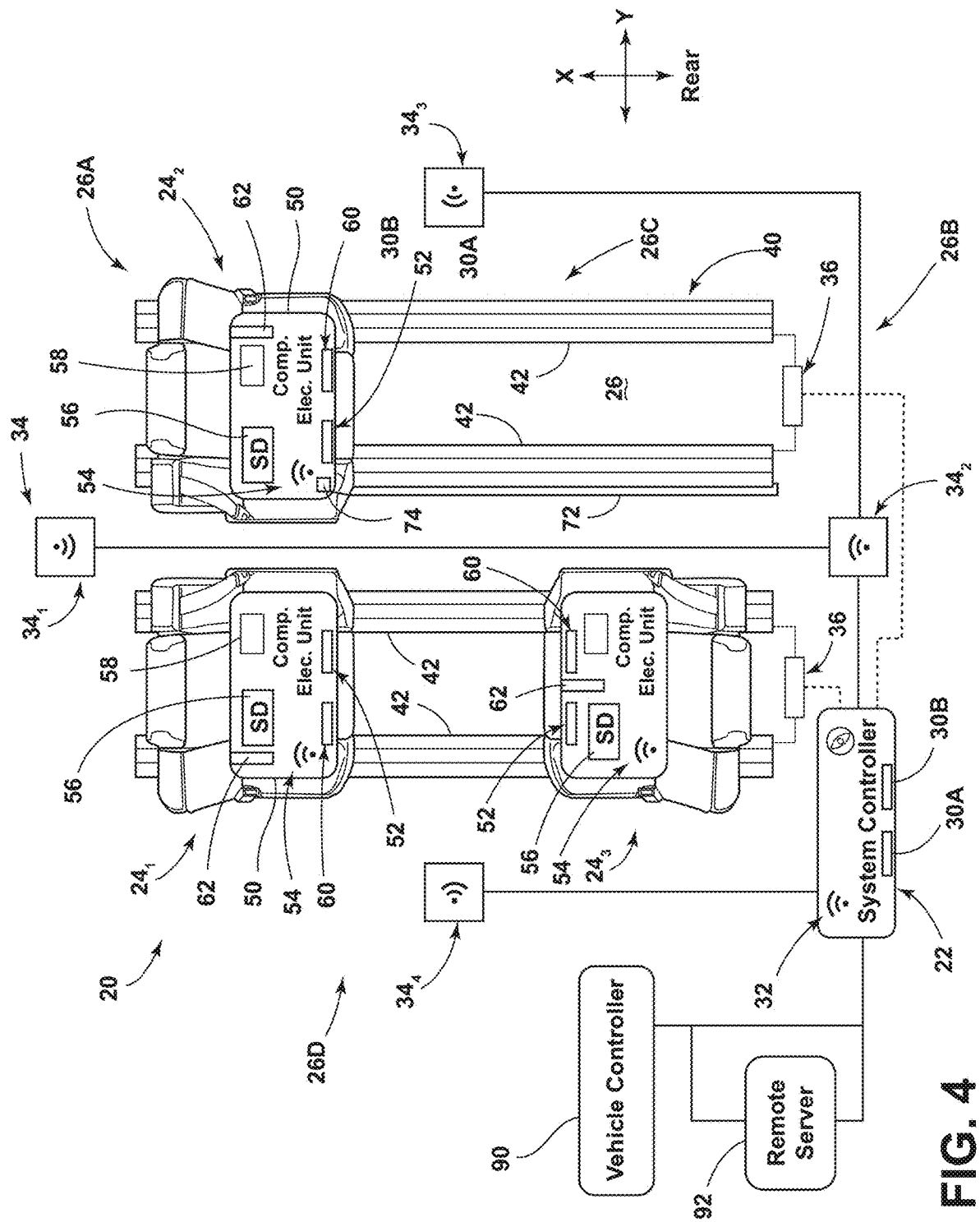
FIG. 4 is a schematic view generally illustrating an embodiment of a removable component system according to teachings of the present disclosure.
Figure 5A:
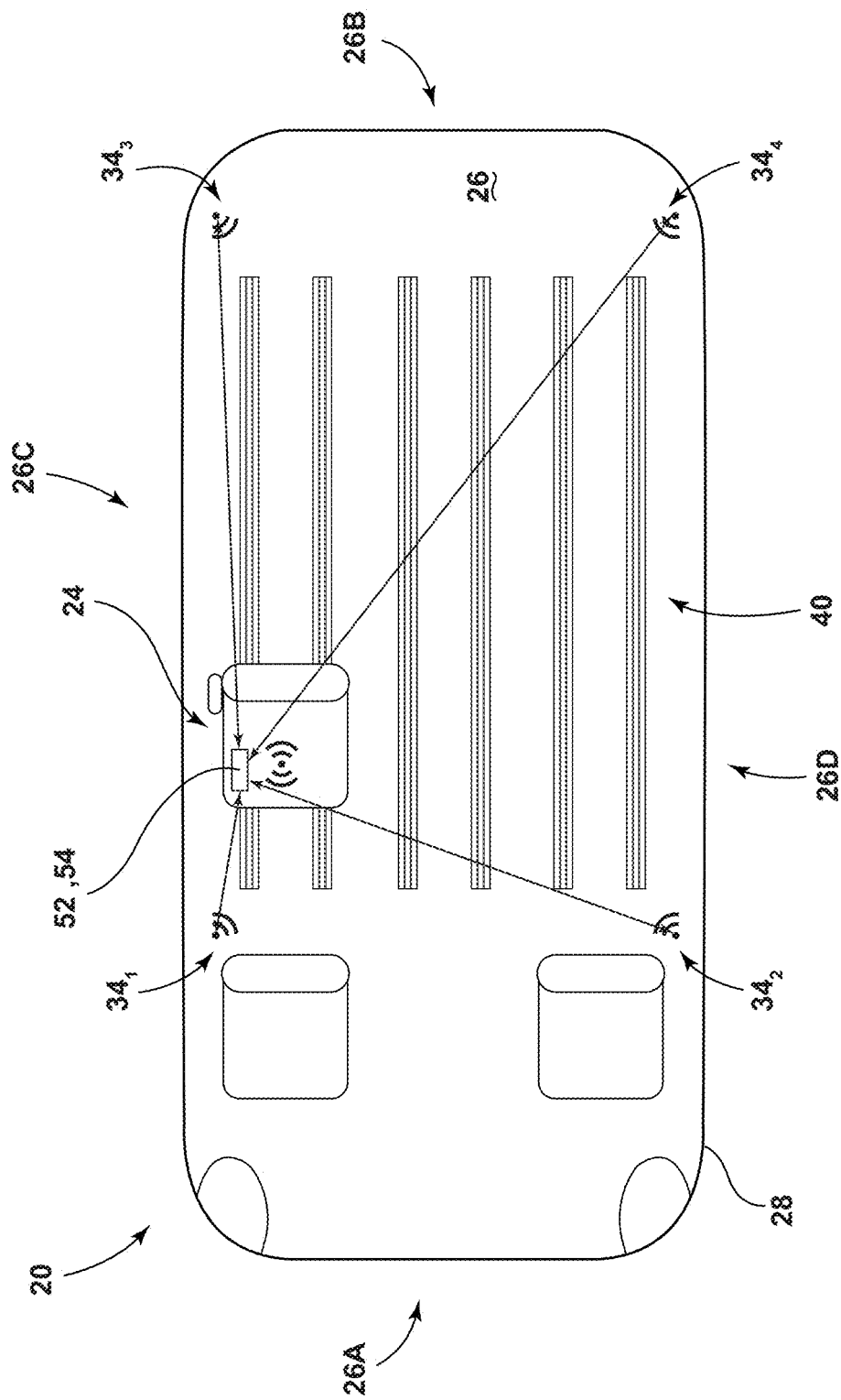
FIGS. 5A-5D are top views generally illustrating embodiments of removable component systems according to teachings of the present disclosure.
Figure 5B:
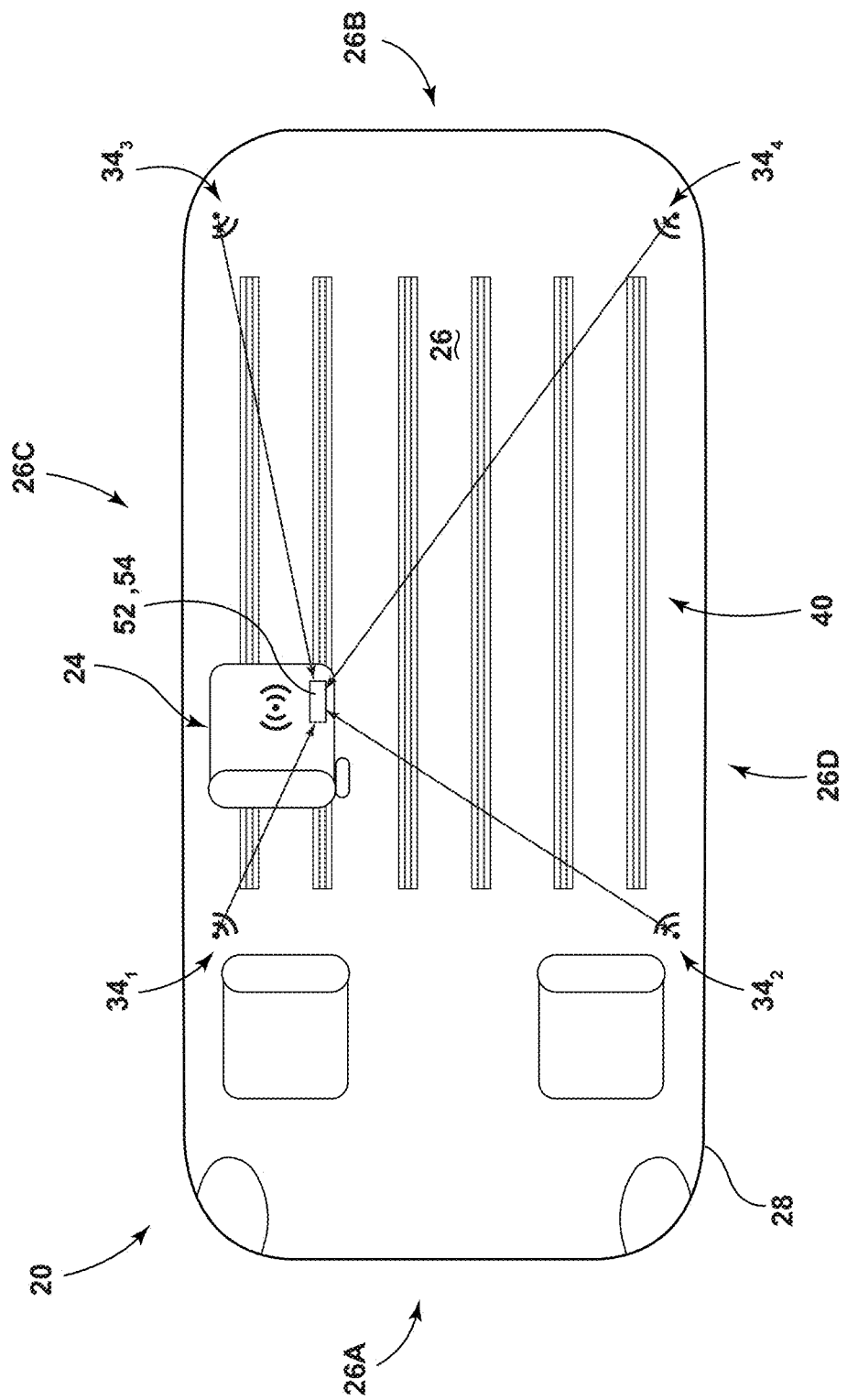
Figure 5C:
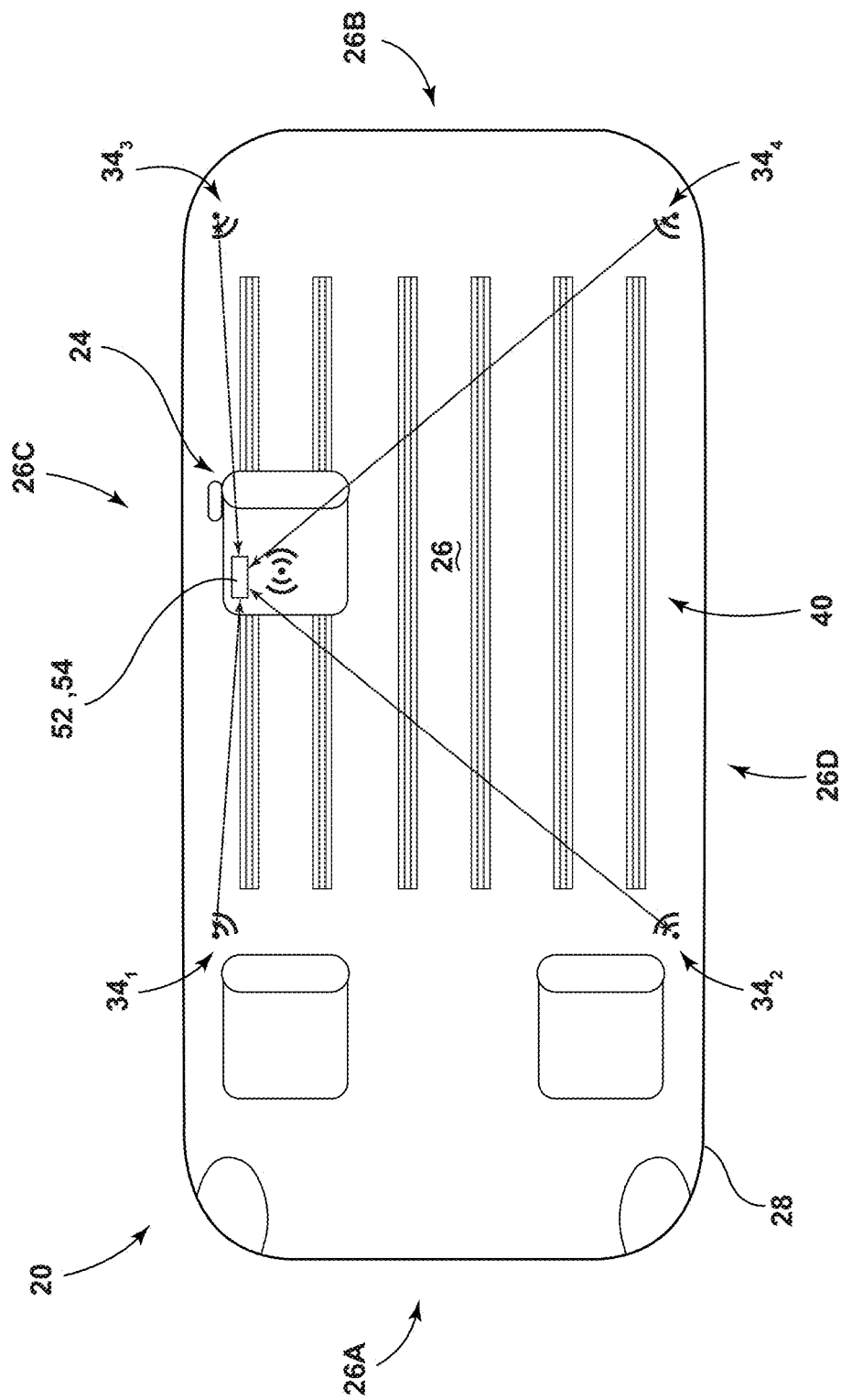
Figure 5D:
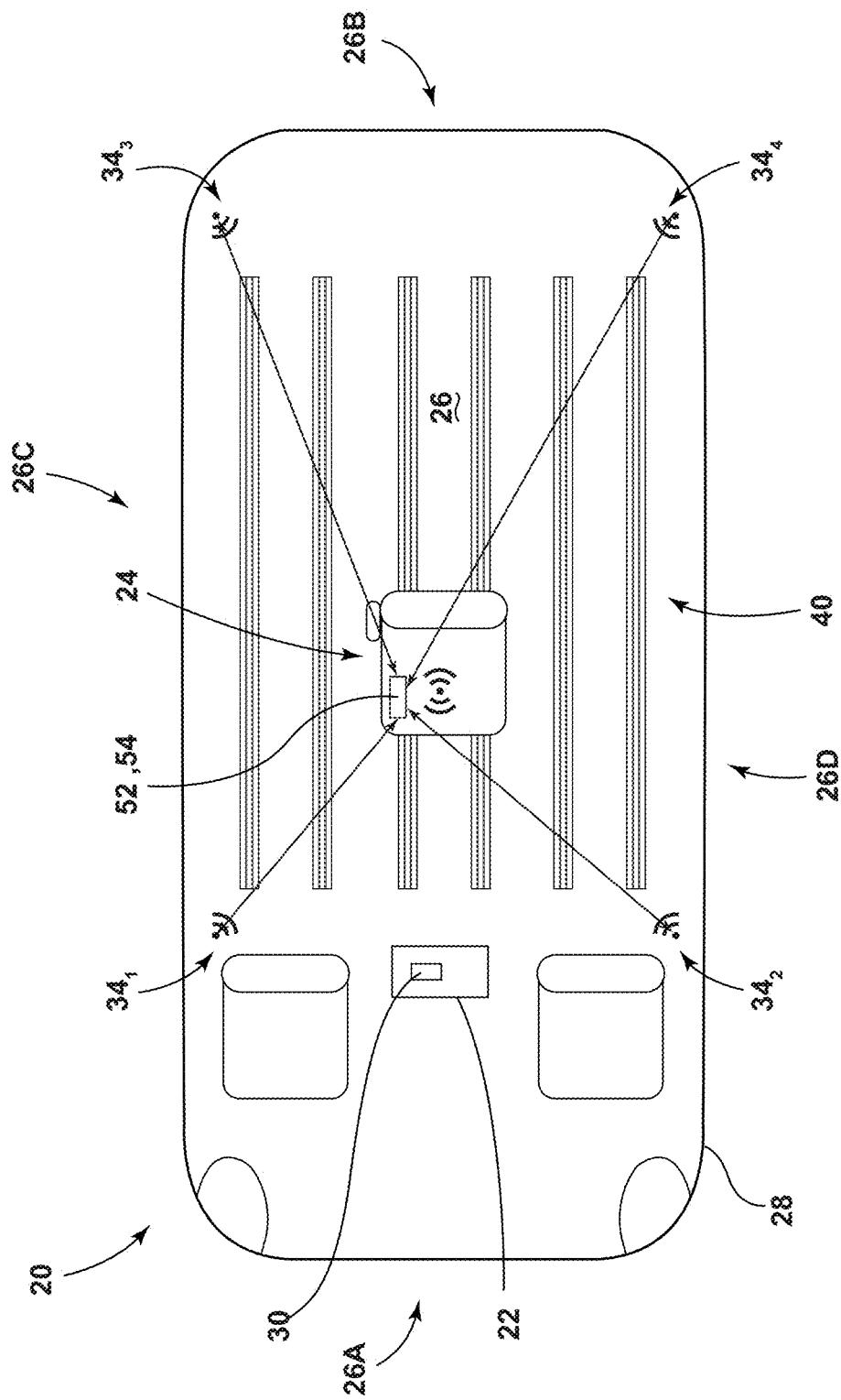
Figure 6:
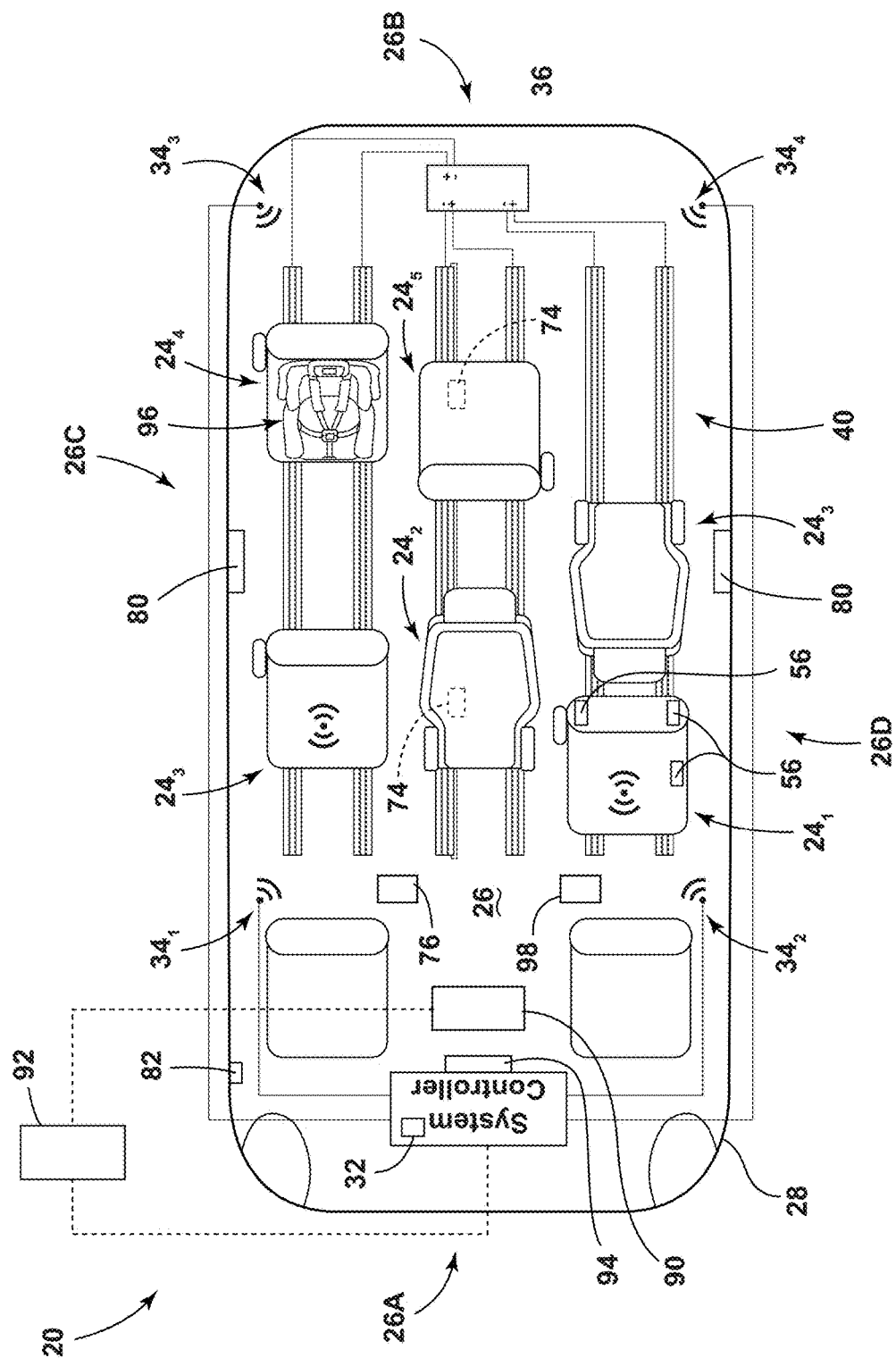
FIG. 6 is a top view generally illustrating an embodiment of a removable component system according to teachings of the present disclosure.

With embodiments, a system electrical unit 22 may include one or more of a variety of configurations. For example and without limitation, and as generally illustrated in FIG. 4, a system electrical unit 22 may include a system controller 30, a communication device 32, one or more antennas 34 (e.g., antennas $34_1$-$34_4$), and/or a power source 36. The system controller 30 may be configured to control operation of and/or communicate with (e.g., via the communication device 32) one or more portions of the removable component system 20 (e.g., removable components 24, safety devices 56, 80, etc.). The one or more antennas 34 may, for example and without limitation, be configured to provide low frequency (LF) signals and/or may include a first antenna $34_1$ and/or or more additional antennas, such as a second antenna $34_2$, a third antenna $34_3$, and/or a fourth antenna $34_4$ (or more or fewer antennas), such as generally illustrated in FIGS. 4-6. The antennas 34 may be disposed in one or more locations relative to the mounting surface 26. For example and without limitation, an antenna $34_1$ may be disposed proximate the front 26A of the mounting surface 26, an antenna $34_2$ may be disposed proximate the rear 26B of the mounting surface 26, an antenna $34_3$ may be disposed proximate a right side 26C of the mounting surface 26, and/or an antenna $34_4$ may be disposed proximate a left side 26D of the mounting surface 26 (see, e.g., FIG. 4). Additionally or alternatively, an antenna $34_1$ may be disposed proximate the front 26A and the right side 26C of the mounting surface 26, an antenna $34_2$ may be disposed proximate the front 26A and the left side 26D of the mounting surface 26, an antenna $34_3$ may be disposed proximate the rear 26B and the right side 26C of the mounting surface 26, and/or an antenna $34_4$ may be disposed proximate the rear 26B and the left side 26D of the mounting surface 26 (see, e.g., FIGS. 5A-6). The system controller 30 may be configured to control operation of the antenna(s) 34. In examples, the system controller 30 may be connected to, in communication with, and/or included with a vehicle controller 90 that may be configured to control, at least in part, operation of a vehicle 28 (e.g., propulsion, steering, braking, etc.).

With examples, such as generally illustrated in FIGS. 1-6, a removable component 24 may, for example and without limitation, include one or more components/elements, which may include a seat (see, e.g., removable components $24_1$-$24_6$), such as a vehicle seat, a console (see, e.g., removable component $24_8$ in FIG. 2D), a table (see, e.g., removable component $24_7$ in FIGS. 2B and 2D), and/or an appliance (see, e.g., removable component $24_9$ in FIG. 2D), such as a refrigerator, among others. A removable component system 20 may include one or more of a variety of combination of removable components 24. For example and without limitation, a removable component system 20 may include six seats $24_1$-$24_6$ (see, e.g., FIGS. 1A, 1C, and 2A) and/or may include four seats $24_1$, $24_2$, $24_3$, $24_5$, a table $24_7$, a console $24_8$, and/or an appliance $24_9$ (see, e.g., FIG. 2D). A removable component system 20 may include a first removable component (e.g., removable component $24_1$) and/or one or more additional removable components 24.

With embodiments, such as generally illustrated in FIGS. 1A-1D, one or more removable components 24 may be selectively connected to and/or removed from the mounting surface 26 directly, such as without additional or external tools. Additionally or alternatively, such as generally illustrated in FIGS. 2A-2D, one or more removable components 24 may be selectively connected to, removed from, moved along and relative to, and/or reconfigurable relative to the mounting surface 26 via a track assembly 40, such as without additional or external tools (e.g., may be selectively secured to and removed from the track assembly 40 in a plurality of positions/orientations along the track assembly 40). A component 24 may, for example and without limitation, include one or more latches/anchors 44 that may be configured to selectively engage and/or contact the track assembly 40 to restrict or prevent movement of a removable component 24 in one or more directions (e.g., an X-direction and/or a Z-direction of the track assembly 40), and/or one or more electrical contacts 46 that may be configured to selectively contact a conductor 48 of a track assembly 40, such as to provide power from a power source 36 to the removable component 24 (see, e.g., FIG. 3A). The one or more latches/anchors 44 and/or the one or more electrical contacts 46 may be actuated (e.g., rotated) between engaged/connected positions and disengaged/disconnected positions in one or more of a variety of ways, such as mechanically (e.g., via a lever/slider/cable, manually, etc.) and/or electronically (e.g., via an electric actuator/motor). The one or more latches/anchors 44 and/or the one or more electrical contacts 46 may restrict insertion/removal of a removable component 24 when in engaged/connected positions, and/or may not restrict insertion/removal of a removable component 24 when in disengaged/disconnected positions.

Figure 3:
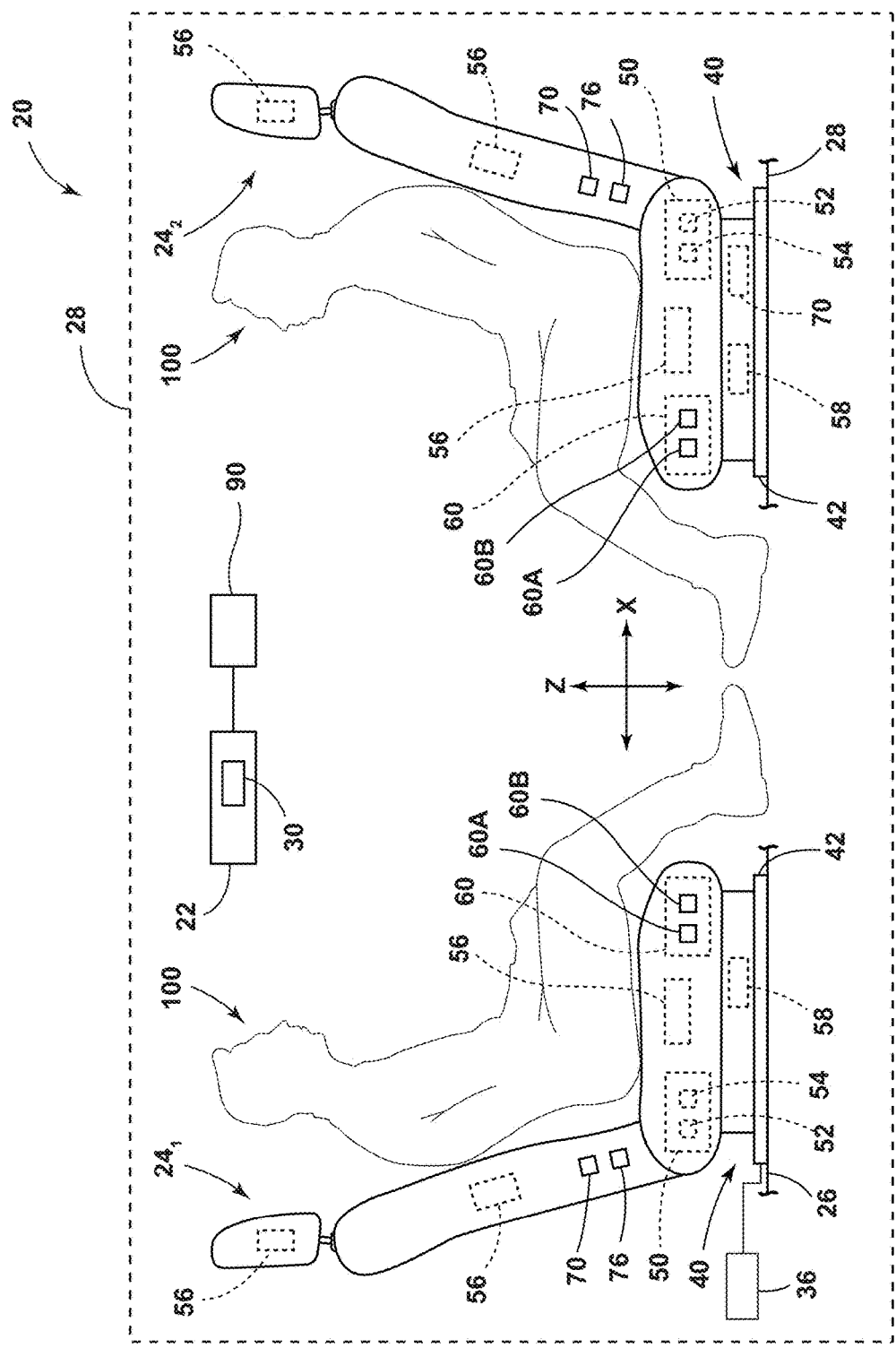
FIG. 3 is a side view generally illustrating an embodiment of a removable component system according to teachings of the present disclosure.
Figure 3A:
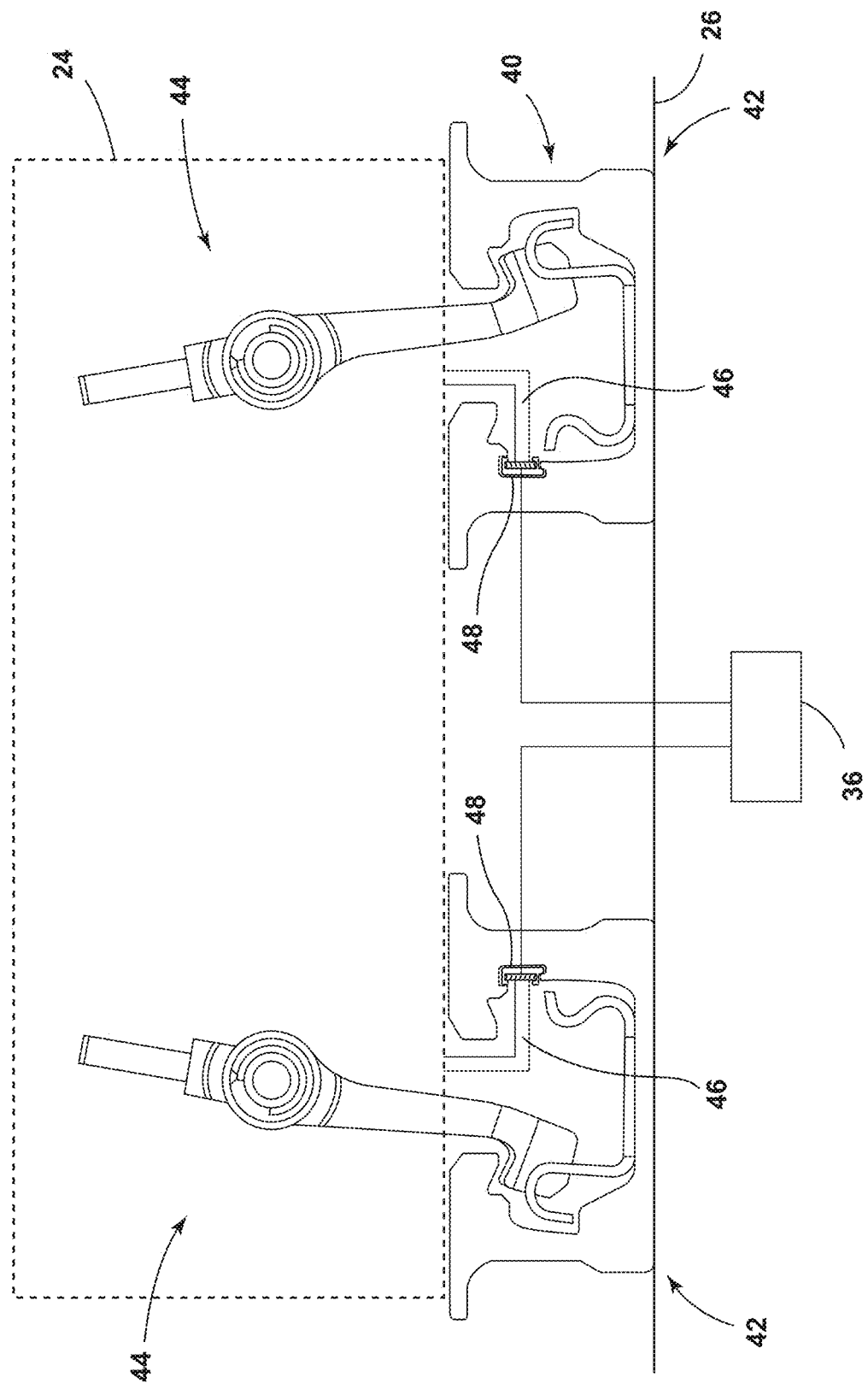
FIG. 3A is an end view generally illustrating embodiments of a track assembly and a removable component of an electrical system according to teachings of the present disclosure.

With embodiments, such as generally illustrated in FIG. 3, a removable component 24 may include a component electrical unit 50, which may include and/or be connected to one or more of a component controller 52, a communication device 54, a safety device (SD) 56, an actuator 58 (e.g., an electric motor), a sensor 60, and/or a power source 62 (e.g., a backup power source), among others. The sensor 60 may, for example and without limitation, include an occupancy sensor 60A and/or a seatbelt sensor 60B, among others. The communication device 54 may be configured to communicate with the system controller 30 and/or the one or more antennas 34, and may, for example, include a receiver, a transmitter, and/or a transceiver. A safety device 56 may, for example and without limitation, include an airbag and/or a seatbelt pretensioner, among others.

In embodiments, a track/rail assembly 40 may include one or more tracks/rails 42 that may be connected (e.g., fixed) to the mounting surface 26. The one or more tracks/rails 42 may, for example and without limitation, extend generally in a longitudinal direction (e.g., an X-direction) of the mounting surface 26, may be disposed in parallel with each other, and/or may be offset from each other, such as in a lateral direction (e.g., a Y-direction). A power source 36 may be connected to the track/rail assembly 40 and/or may provide power to one or more tracks/rails 42 of the track/rail assembly 40 (see, e.g., FIG. 3), which may provide power to the one or more removable components 24. For example, one or more removable components 24 may be connected to a respective pair of tracks/rails 42 that may provide electrical power to a component electrical unit 50 of the removable component 24 and/or elements thereof.

In examples, it may be desirable to provide information from and/or about a removable component 24 to the system controller 30 and/or to provide commands from the system controller 30 to a component 24. For example and without limitation, it may be desirable to provide occupancy and/or seatbelt status information of the one or more components 24 to the system controller 30. With some embodiments, the one or more components 24 and the system controller 30 may be configured for wireless communication, such as via respective communication devices 32, 54.

With examples, such as generally illustrated in FIGS. 5A, 5B, 5C, 5D, and 6, a removable component system 20 may be configured to determine the position (e.g., X-Y position) and/or orientation of the one or more removable components 24 relative to the mounting surface 26. For example and without limitation, a plurality of antennas 34 may be connected to the system controller 30. The antennas 34 may be connected to and/or included with the communication device 32. The system controller 30 may be configured to control the antennas 34 to transmit signals (e.g., LF signals, ultra-wideband (UWB) signals, etc.) proximate the one or more removable components 24. A communication device 54 of a removable component 24 may be configured to receive the signals from the antennas 34. The communication device 54, the component controller 52, and/or the system controller 30 may be configured to determine a position and/or orientation of the removable component 24 according to the received signals, such as via one or more received signal strength indicator (RSSI) determinations. Examples of RSSI systems are generally described in U.S. Pat. Nos. 7,042,342 and 7,388,466, which are hereby incorporated by reference in their entireties. Additionally or alternatively, the component electrical unit 50 may be configured to provide information from the communication device 54 (e.g., signal strength information) to the system controller 30, and the system controller 30 may determine the position and/or orientation of the removable component 24, at least in part, via the information from component electrical unit 50.

In embodiments, an orientation of a removable component 24 may, for instance, include directed/facing forward, directed/facing rearward, disposed at an angle (e.g., in an X-Y plane) relative to the mounting surface 26, such as an oblique or right angle relative to an X-direction of the mounting surface 26 if the removable component 24 is not facing forward or rearward.

With embodiments, a removable component system 20 may be configured to determine positions and/or orientations of removable components 24 via one or more methods in addition to or instead of RSSI. For example and without limitation, the removable component system 20 may be configured to utilize global positioning system (GPS) devices 70 associated with one or more removable components 24, time-of-flight determinations (e.g., via communication devices 32, 54), angle-of-arrival determinations (e.g., via communication devices 32, 54), encoder features 72 of the track assembly 40 (e.g., metal formations, colors, barcodes, etc.) and corresponding encoder sensors 74, orientation sensors 76 (e.g., gyroscopes, accelerometers, magnetometers, etc.), and/or different voltages provided to the track assembly 40 (e.g., via the power source 36), among other methods.

With embodiments, a removable component 24 may be configured for selective connection (e.g., electrical and/or mechanical connection) with the mounting surface 26 in a plurality of orientations/configurations. The plurality of configurations may include a first configuration facing a first direction (see, e.g., removable components $24_4$-$24_6$ of FIG. 1A) and/or a second configuration facing a second direction that is different than the first direction (see, e.g., removable components $24_1$-$24_3$ of FIG. 1A). The first direction may for example, be toward a front 26A of the mounting surface 26, and/or the second direction may, for example, be toward a rear 26B of the mounting surface 26. Obtaining the orientations of removable components 24 may include determining which configurations of the plurality of configurations the removable components 24 are disposed in.

In embodiments, a removable component system 20 may include one or more child seats 96 (e.g., a car seat for a child) that may be configured as or connected to a removable component 24. A system controller 30 and/or a component controller 52 may be configured to determine the position and/or orientation of a child seat 96, such as via a sensor 60 that may be included with a removable component 24 or the child seat 96, an antenna 34 and a communication device 54 of the removable component 24 or the child seat 96 (e.g., as described above), and/or via a sensor 98 of the mounting surface 26 and/or a vehicle 28. The sensor 98 may, for example and without limitation, include a camera, which may include one or more of a variety of image and/or video capturing devices.

In examples, a removable component system 20 may be configured to control one or more devices in the removable component system 20. For example and without limitation, the system controller 30 and/or a component controller 52 may be configured to control one or more safety devices, such as a safety device 56 of a removable component 24 and/or a safety device 80 associated with the mounting surface 26 and/or a vehicle 28 (e.g., a vehicle safety device), and/or may be configured to control an actuator 58 of a removable component 24. Controlling a safety device 56, 80 may include determining whether to activate a safety device according to, at least in part, the position, the orientation, and/or the occupancy status of the removable component 24. For example and without limitation, a system controller 30 and/or a component controller 52 may not activate a safety device 56 of a removable component 24 if the removable component 24 is not occupied (e.g., as determined via an occupancy sensor 60A) and/or may not activate a safety device 80 if an occupied removable component 24 is not disposed proximate the safety device 80, such as to limit waste (e.g., some safety devices may only be used one time before replacement may be needed). Safety devices 80 of a mounting surface 26 and/or vehicle 28 may, for example and without limitation, include airbags, such as curtain airbags, and/or may be disposed in a fixed manner relative to the mounting surface 26 (e.g., may be fixed to the vehicle 28).

In embodiments, a system controller 30 and/or a component controller 52 may each include a single controller (e.g., that performs all functions) or may include a plurality of controllers that may each perform at least some different functions. For example and without limitation, a system controller 30 may include a first controller 30A that may monitor, determine, and/or control position and/or orientation of one or more removable components 24 (see, e.g., FIG. 4). Additionally or alternatively, a system controller 30 may include a second controller 30B that may monitor and/or control one or more safety devices 56, 80.

With embodiments, a removable component system 20 may be configured to determine which safety devices 56, 80 to activate in the event of a crash or imminent crash. For example, a vehicle controller 90 may obtain crash information, such as from one or more crash sensors 82 (e.g., accelerometers, sensors of other vehicles, GPS sensors, etc.), and may provide the crash information to the system controller 30, which may provide the crash information or related information (e.g., trigger signals) to one or more component electrical units 50 and/or component controllers 52 thereof. The system controller 30 and/or component controllers 52 may be configured to activate safety devices 56, 80 of or proximate certain removable components 24. For example, the system controller 30 may activate safety devices 80 of a vehicle 28 that are proximate removable components 24 that include occupied seats and/or respective component controllers 52 may activate one or more respective safety devices 56 of removable components 24.

In embodiments, a system controller 30 and/or a component controller 52 may obtain and/or include information about the size and/or shape of an activated safety device 56, 80. The system controller 30 and/or a component controller 52 may use such information and/or the crash information (e.g., a direction of impact) to determine if the activated safety device 56, 80 would be sufficiently close to an occupant 100 that activating the safety device 56, 80 would improve the safety (e.g., help restrain movement) of the occupant 100 during the crash. For example, if the activated safety is expected to overlap with the current position of the occupant 100 or expected movement of the occupant 100 during the crash, the system controller 30 and/or the component controller 52 may activate the safety device 56, 80. Additionally or alternatively, the system controller 30 and/or a component controller 52 may determine if a removable component 24 and/or an occupant 100 thereof is too close to a safety device 56, 80 for the safety device 56, 80 to be deployed in a safe manner, and may not activate the safety device 56, 80 if the removable component 24 or occupant 100 is too close.

In embodiments, a system controller 30 and/or a component controller 52 may be configured to determine whether to activate one or more safety devices 56 that may be connected to and/or included with a removable component 24. A system controller 30 and/or a component controller 52 may be configured to activate some or all safety devices 56 of a removable component 24 if the removable component 24 is a seat and is occupied by a user/occupant 100 (e.g., as determined via an occupancy sensor 60A). Additionally or alternatively, a component controller 52 and/or the system controller 30 may determine if activation of one or more safety devices 56 of a removable component 24 may impact other removable components 24, such as adjacent or nearby removable components 24. For example, if the system controller 30 and/or a component controller 52 determines that a safety device 56 of a removable component 24, when activated, is expected to contact another removable component 24 or an occupant 100 thereof (e.g., via a determination of the position of the other removable component 24 and information about the safety device 56), the component controller 52 and/or the system controller 30 may determine if the safety device 56, when activated, would be too close to the other removable component(s) 24 or a child seat 96 or occupant 100 associated therewith. If the safety device 56, when activated, would be too close to another removable component 24 or a child seat 96 or an occupant 100 associated therewith, the system controller 30 and/or the component controller 52 may not activate that safety device 56.

With embodiments, a system controller 30 and/or a component controller 52 may determine if safety devices 56 of other removable components 24 are sufficiently close to a certain removable component 24 such that safety devices 56 of the other removable components 24 could be activated to improve the safety of the occupant 100 of the certain removable component 24, which may supplement safety devices 56, if any, of the certain removable component 24. A system controller 30 and/or a component controller 52 may activate such safety devices 56 of other removable components 24 in the event of a crash or imminent crash, such as if such activation would not reduce the safety of the occupant(s) 100 of the other removable component(s) 24.

With examples, a removable component system 20 may be configured to determine the position/orientation of a plurality of removable components 24 relative to the mounting surface 26. The removable component system 20 may be configured to control movement of a removable component 24 according, at least in part, to the current position/orientation of the removable component 24 and the current positions/orientations of the other removable components 24. For example and without limitation, the system controller 30 may be configured to control movement of removable components 24 such that the removable components 24 do not contact and/or damage each other, and/or do not materially interfere with movement of other removable components 24. Controlling movement of a removable component 24 may include controlling one or more actuators 58 (e.g., electric motors) of the removable component 24.

Figure 7:
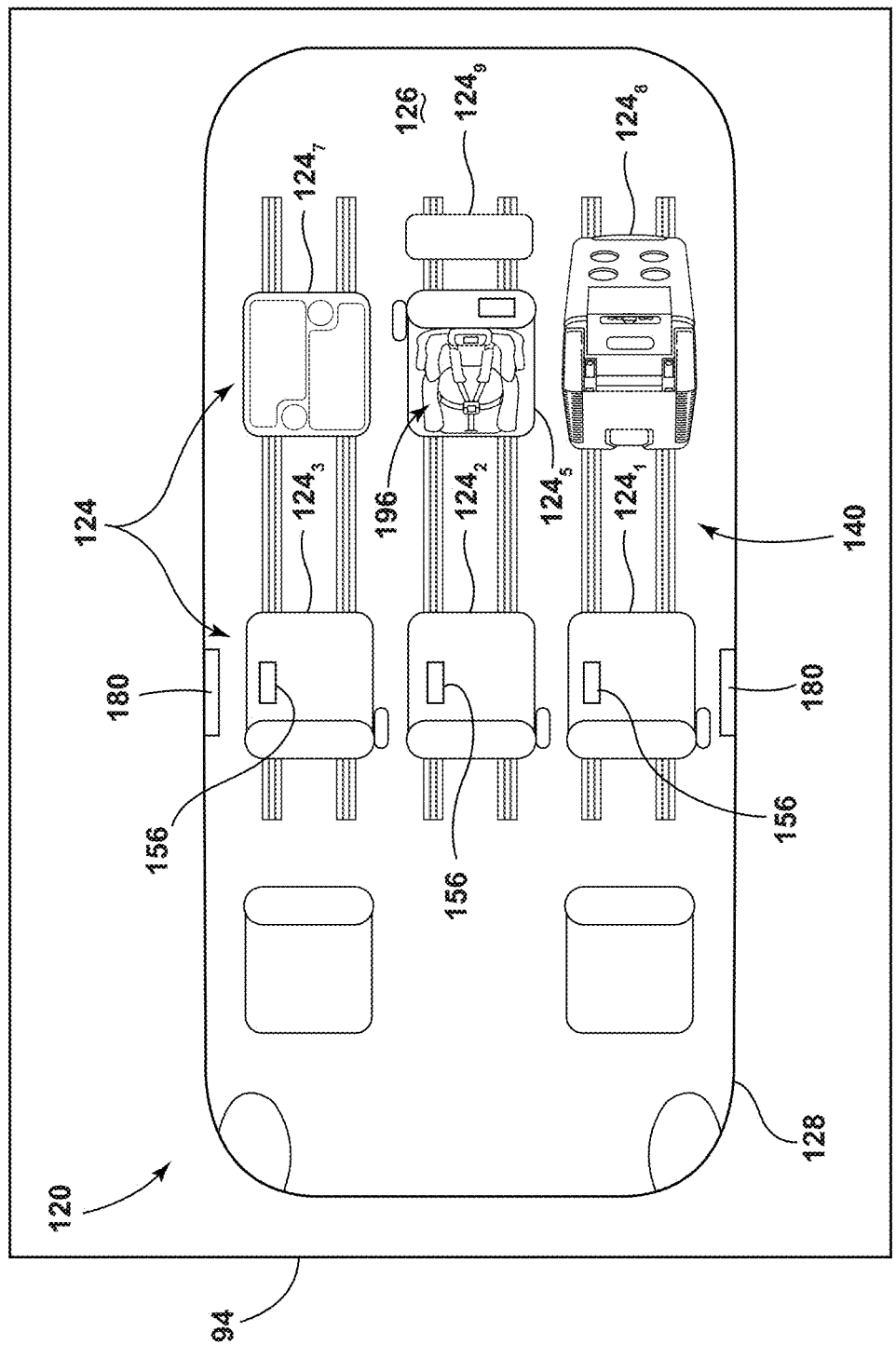
FIG. 7 is a representation of an embodiment of a display showing a model of a removable component system according to teachings of the present disclosure.

In examples, such as generally illustrated in FIG. 7, a system controller 30 may be configured to create an electronic/virtual system map or model 120 of the system 20. The system map/model 120 may include electronic/virtual models of various elements that may be part of a removable component system 20, such as a model 126 of the mounting surface 26, models 124 of one or more removable components 24 (e.g., models $124_1$, $124_2$, $124_3$, $124_5$, $124_7$, $124_8$, $124_9$ of removable components $24_1$, $24_2$, $24_3$, $24_5$, $24_7$, $24_8$, $24_9$), a model 140 of a track assembly 40, and/or models 196 of one or more child seats 96. The models may be provided in the system map/model 120 according to the determined positions/orientations of the removable components 24 and/or the child seat(s) 96. Creating the system map/model 120 may include communicating with the removable components 24 to identify the removable components 24, selecting models 124 to represent the identified removable components 24 (which may include identifying dimensions of the removable components 24), determining the position/orientation of the removable components 24, and/or assigning the model 124 of each identified removable component 24 to a position in a model 126 of the mounting surface 26 and/or a model 128 of a vehicle 28. The system controller 30 may be configured to associate information received from or about a removable component 24 (e.g., status information) with the model 124 of that removable component 24 in the system map/model 120. The system controller 30 may be configured to transmit the system map/model 120 to a vehicle controller 90 and/or to a remote server 92. The remote server 92 may, for example and without limitation, be connected to and/or incorporated with a ride-share or transportation system.

With examples, a system controller 30 may be configured to update the map/model 120 and/or create a new map/model 120 if the system controller 30 detects a change in the system 20. For example and without limitation, if the system controller 30 receives information from a removable component 24 that indicates that an occupancy status or seatbelt status of the removable component 24 has changed, and/or if system controller 30 determines that the position/orientation of a removable component 24 has changed, the system controller 30 may update the system map/model 120 accordingly. The system controller 30 may be configured to check for system updates automatically, such as at certain time intervals and/or with the occurrence of certain events (e.g., a user 100 actuates an actuator 58 of a removable component 24, a vehicle 28 is turned on or off, a seatbelt is buckled, etc.).

In embodiments, a map/model 120 may include models 156, 180 of safety devices 56, 80 of the mounting surface 26 and/or the vehicle 28, and/or of the removable components 24. The models 156, 180 of the safety devices 56, 80 may include an inactive state and an activated state, which may include larger dimensions and/or a different position than the inactive state. The system controller 30 and/or a component controller 52 may utilize the models 156, 180 of the safety devices 56, 80 in determining which safety devices 56, 80 to activate in the event of a crash or imminent crash.

With some embodiments, such as generally illustrated in FIG. 7, a system controller 30 may be configured to display at least some portions of a system map/model 120 on an electronic display 94 that may be associated with the mounting surface 26 and/or a vehicle 28.

Figure 8:
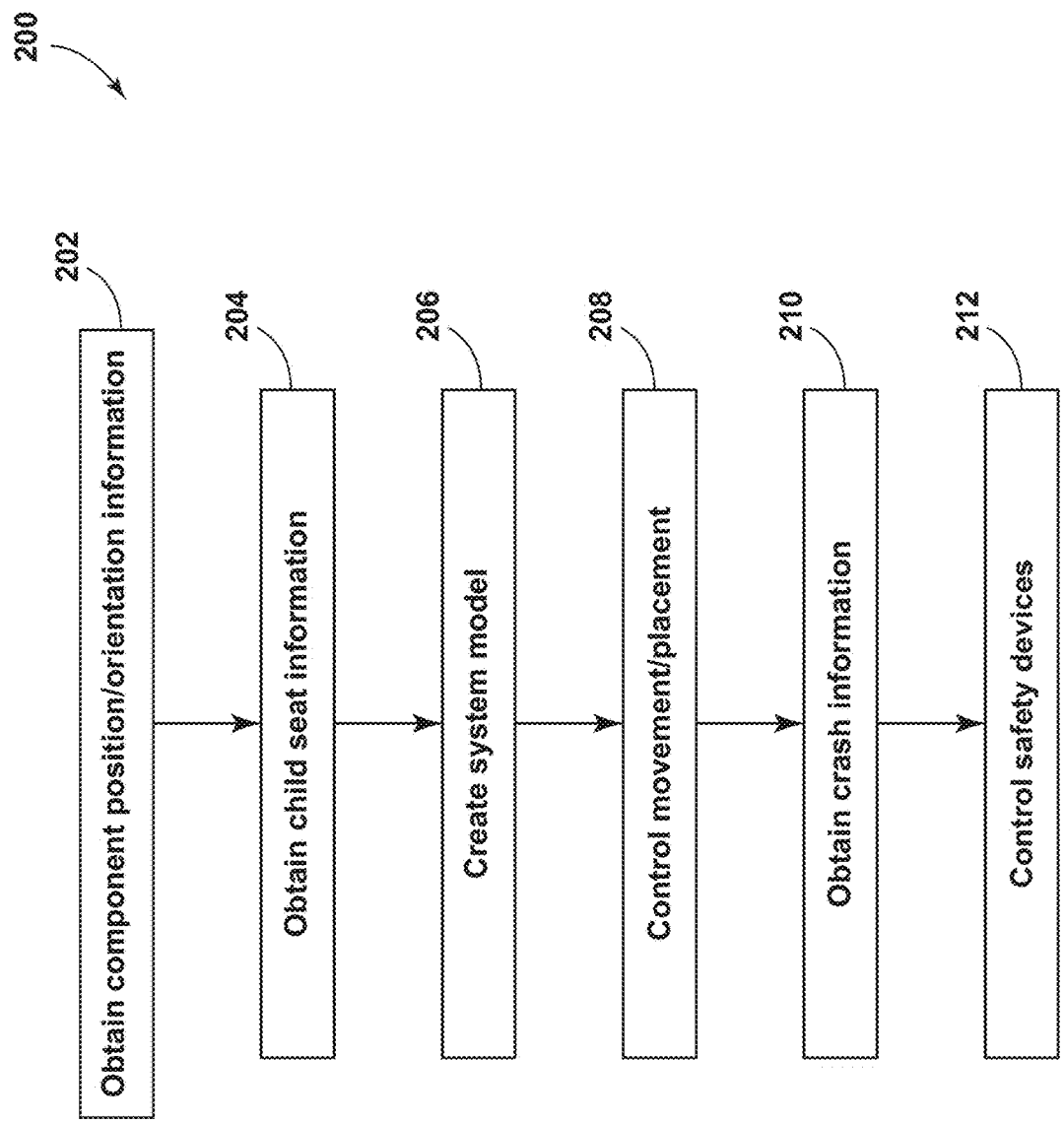
FIG. 8 is a flow chart generally illustrating an embodiment of a method of operating a removable component system according to teachings of the present disclosure.

An embodiment of a method 200 of operating a removable component system 20 is generally illustrated in FIG. 8. The method 200 may include determining positions and/or orientations of one or more removable components 24 relative to a mounting surface 26 and/or a vehicle 28 (block 202). Determining positions and/or orientations of removable components 24 may, for example, include one or more received signal strength indicator determinations, such as via one or more antennas 34 that may be included with a communication device 32 of a system controller 30 and/or via communication devices 54 of the removable components 24. The method 200 may include obtaining information (e.g., position, orientation, etc.) regarding any child seats 96 in the system 20 (block 204). Obtaining information about any child seats 96 (block 204) may be conducted in a similar manner as obtaining information about removable components 24. The method 200 may include creating a system model 120 (block 206). The system model 120 may include a model 126 of the mounting surface 26, models 124 of removable components 24, models 156, 180 of safety devices 56, 80, and/or models 196 of child seats 96. The method 200 may include controlling movement and/or placement (e.g., connection position) of removable components 24 and/or child seats 96 (block 208). The method 200 may include obtaining crash information (block 210), which may include a crash sensor 82 and/or a vehicle controller 90 providing crash information to a system controller 30 and/or one or more component controllers 52. The method 200 may include controlling safety devices 56, 80 (block 212), such as according to the crash information and the obtained positions and/or orientations of removable components 24, safety devices 56, 80, and/or child seats 96.

While some exemplary embodiments are shown in the drawings for illustrative purposes with a track assembly 40, embodiments of the current disclosure are not limited to configurations with track assemblies 40. While some exemplary embodiments of track assemblies 40 are shown in the drawings for illustrative purposes as extending in the X-direction, embodiments of removable component systems 20 may include tracks that extend in other directions (e.g., the Y-direction, the Z-direction, etc.) and/or that include a matrix-type configuration that may allow for a wide range of movement.

In examples, a controller (e.g., a system controller 30, a component controller 52) may include an electronic controller and/or include an electronic processor, such as a programmable microprocessor and/or microcontroller. In embodiments, a controller may include, for example, an application specific integrated circuit (ASIC). A controller may include a central processing unit (CPU), a memory (e.g., a non-transitory computer-readable storage medium), and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a controller (e.g., a system controller 30, a component controller 52), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A removable component system, comprising:
   a removable component selectively connectable to a mounting surface, the removable component including a component electrical unit;
   an antenna;
   a system controller configured to communicate with the component electrical unit and the antenna;
   a track assembly configured to be fixed to said mounting surface; and
   a plurality of additional removable components configured for selective connection with, removal from, and movement along the track assembly;
   wherein the removable component is selectively connectable to said mounting surface via the track assembly;
   the removable component is configured for selective connection with, removal from, and movement along the track assembly;
   the system controller is configured to obtain a position of the removable component relative to said mounting surface via the antenna and the component electrical unit; and
   the system controller is configured to obtain a position and an orientation of at least some of the plurality of additional removable components.

2. The removable component system of claim 1, wherein the system controller is configured to obtain the position of the removable component and the position of each of the plurality of additional removable components via one or more received signal strength indicator determinations.

3. The removable component system of claim 2, wherein a component controller of the component electrical unit of the removable component and component controllers of the additional removable components are configured to (i) conduct the one or more received signal strength indicator determinations and (ii) provide information from the one or more received signal strength indicator determinations to the system controller.

4. The removable component system of claim 1, wherein the system controller is configured to generate an electronic map or model of the removable component and the plurality of additional removable components according to the position of the removable component and the positions and orientations of the at least some of the plurality of additional removable components.

5. A vehicle, comprising:
   a vehicle controller configured to control operation of the vehicle; and
   the removable component system of claim 1;
   wherein the mounting surface is a floor of the vehicle;
   the removable component includes a safety device;
   the removable component is a vehicle seat; and
   the system controller is in communication and/or incorporated with the vehicle controller.

6. The vehicle of claim 5, wherein at least one of the plurality of additional removable components includes an additional safety device; and
   the removable component system includes a vehicle safety device disposed in a fixed manner relative to the vehicle.

7. The vehicle of claim 6, wherein the system controller is configured to obtain crash information and provide the crash information to a component controller of the component electrical unit of the removable component; and
   the component controller is configured to control the safety device according to the crash information, the position of the removable component, and the positions of the plurality of additional removable components.

8. The vehicle of claim 7, wherein the system controller is configured to control the vehicle safety device according to the crash information, the position of the removable component, and the positions and orientations of the at least some of the plurality of additional removable components.

9. A method of operating the removable component system of claim 1, the method comprising:
   obtaining the position and an orientation of the removable component;
   obtaining information about any child seats in the removable component system;
   creating a virtual system model of the removable component system, the system model including models of the removable component, one or more safety devices, and said mounting surface;
   obtaining crash information from one or more crash sensors; and
   controlling the one or more safety devices according to the position of the removable component, the orientation or the removable component, the crash information, and the information about any child seats.

10. A vehicle, comprising:
a mounting surface;
a vehicle controller configured to control operation of the vehicle; and
a removable component system including:
- a removable component selectively connectable to the mounting surface, the removable component including a component electrical unit;
- an antenna;
- a system controller configured to communicate with the component electrical unit and the antenna; and
- a track assembly configured to be fixed to the mounting surface;

wherein the removable component is selectively connectable to the mounting surface via the track assembly;
the removable component is configured for selective connection with, removal from, and movement along the track assembly;
the system controller is configured to obtain a position of the removable component relative to the mounting surface via the antenna and the component electrical unit;
the mounting surface is a floor of the vehicle;
the removable component is a vehicle seat; and
the system controller is in communication and/or incorporated with the vehicle controller.

11. The vehicle of claim 10, including a plurality of additional removable components configured for selective connection with, removal from, and movement along the track assembly.

12. The vehicle of claim 11, wherein the system controller is configured to obtain a position and an orientation of at least some of the plurality of additional removable components.

13. The vehicle of claim 10, wherein the system controller is configured to obtain the position of the removable component via an angle of arrival determination and/or a time-of-flight determination.

14. The vehicle of claim 10, wherein the removable component includes a safety device.

15. The vehicle of claim 14, wherein the safety device includes an airbag and/or a seatbelt pretensioner.

16. The vehicle of claim 15, wherein at least one of the system controller and a component controller of the component electrical unit is configured to control, at least indirectly, the safety device according to the position of the removable component.

17. The vehicle of claim 10, wherein the removable component system includes a vehicle safety device disposed in a fixed manner relative to the vehicle; and
the system controller is configured to control the vehicle safety device, at least in part, according to the position and/or an orientation of the removable component.

18. The vehicle of claim 10, wherein the system controller is configured to generate an electronic map or model of the removable component and a plurality of additional removable components according to the position of the removable component and positions of the plurality of additional removable components; and
wherein the electronic map or model includes status information of the removable component and the plurality of additional removable components.

19. The vehicle of claim 10, including a plurality of additional removable components configured for connection with the mounting surface; and
a plurality of additional antennas;
wherein each of the additional removable components includes a respective component electrical unit; and
the system controller is configured to obtain positions of the additional removable components relative to the mounting surface via the antenna, the plurality of additional antennas, and the respective component electrical units.

20. A removable component system, comprising:
a removable component selectively connectable to a mounting surface, the removable component including a component electrical unit;
an antenna;
a system controller configured to communicate with the component electrical unit and the antenna;
a track assembly configured to be fixed to said mounting surface;
a plurality of additional removable components configured for connection with said mounting surface; and
a plurality of additional antennas;
wherein the removable component is selectively connectable to said mounting surface via the track assembly;
the removable component is configured for selective connection with, removal from, and movement along the track assembly;
the system controller is configured to obtain a position of the removable component relative to said mounting surface via the antenna and the component electrical unit;
each of the additional removable components includes a respective component electrical unit;
the system controller is configured to obtain positions of the additional removable components relative to said mounting surface via the antenna, the plurality of additional antennas, and the respective component electrical units;
the removable component and the plurality of additional removable components are configured for selective connection with the track assembly in a plurality of configurations;
the plurality of configurations includes a first configuration facing a first direction and a second configuration facing a second direction that is different than the first direction;
the system controller is configured to obtain orientations of the removable component and the plurality of additional removable components; and
obtaining the orientations of the removable component and the plurality of additional removable components includes determining which configurations of the plurality of configurations the removable component and the plurality of additional removable components are disposed in.

* * * * *